(12) United States Patent
Doi et al.

(10) Patent No.: US 7,897,231 B2
(45) Date of Patent: Mar. 1, 2011

(54) OPTICAL INFORMATION RECORDING MEDIUM AND METHOD FOR MANUFACTURING THE SAME

(75) Inventors: Yukako Doi, Osaka (JP); Rie Kojima, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 664 days.

(21) Appl. No.: 11/887,588

(22) PCT Filed: Mar. 24, 2006

(86) PCT No.: PCT/JP2006/306010
§ 371 (c)(1),
(2), (4) Date: Oct. 1, 2007

(87) PCT Pub. No.: WO2006/109534
PCT Pub. Date: Oct. 19, 2006

(65) Prior Publication Data
US 2009/0269539 A1 Oct. 29, 2009

(30) Foreign Application Priority Data
Apr. 1, 2005 (JP) .............................. 2005-105870

(51) Int. Cl.
*B32B 3/02* (2006.01)
(52) U.S. Cl. .................... 428/64.1; 428/64.4; 428/64.5; 428/64.6; 430/270.13
(58) Field of Classification Search ........................ None
See application file for complete search history.

(56) References Cited

U.S. PATENT DOCUMENTS

| 6,503,690 B1 | 1/2003 | Uno et al. |
| 6,689,445 B2 | 2/2004 | Kojima et al. |
| 6,821,707 B2 | 11/2004 | Uno et al. |
| 2001/0028938 A1 | 10/2001 | Kojima et al. |
| 2001/0041304 A1 | 11/2001 | Uno et al. |
| 2003/0064211 A1 | 4/2003 | Hirotsune et al. |
| 2003/0138669 A1 | 7/2003 | Kojima et al. |
| 2003/0179117 A1 | 9/2003 | Kojima et al. |

(Continued)

FOREIGN PATENT DOCUMENTS

JP    5-159373    6/1993

(Continued)

OTHER PUBLICATIONS

International Search Report of Jun. 27, 2006 issued in the International Application No. PCT/JP2006/306010.

(Continued)

*Primary Examiner*—Elizabeth Mulvaney
(74) *Attorney, Agent, or Firm*—Wenderoth, Lind & Ponack, L.L.P.

(57) ABSTRACT

The present invention provides an information recording medium with high reliability and excellent repeated rewriting performance even when no interface layer is formed and a method for manufacturing the same. Accordingly, the information recording medium for carrying out recording and/or reproducing by light irradiation or electric energy application has a material layer containing at least one element selected from a group GM consisting of Sn and Ga, at least one element selected from a group GL consisting of Ta and Y, and oxygen.

39 Claims, 4 Drawing Sheets

U.S. PATENT DOCUMENTS

| | | |
|---|---|---|
| 2004/0023069 A1 | 2/2004 | Kojima et al. |
| 2005/0018593 A1 | 1/2005 | Doi et al. |
| 2005/0064334 A1* | 3/2005 | Hirotsune et al. ...... 430/270.13 |
| 2005/0074694 A1* | 4/2005 | Nishihara et al. ...... 430/270.13 |

FOREIGN PATENT DOCUMENTS

| | | |
|---|---|---|
| JP | 8-77604 | 3/1996 |
| JP | 10-275360 | 10/1998 |
| JP | 2001-67722 | 3/2001 |
| JP | 2001-322357 | 11/2001 |
| JP | 2003-228881 | 8/2003 |
| JP | 2003-233931 | 8/2003 |
| JP | 2003-323743 | 11/2003 |
| JP | 3612927 | 1/2005 |
| JP | 2005-63634 | 3/2005 |
| JP | 3666854 | 6/2005 |
| WO | 97/34298 | 9/1997 |

OTHER PUBLICATIONS

Yamada et al., "Phase-Change Optical Disk Having a Nitride Interface Layer", Japanese Journal of Applied Physics, vol. 37 (1998), Apr. 1998, pp. 2104-2110.

Chinese Office Action issued Jun. 5, 2009 in counterpart Chinese Application No. 200680010797.7.

* cited by examiner

OPTICAL INFORMATION RECORDING MEDIUM AND METHOD FOR MANUFACTURING THE SAME

BACKGROUND OF THE INVENTION

I. Technical Field

The present invention relates to an information recording medium for optically or electrically recording and/or reproducing information and a method for manufacturing the same.

II. Description of the Related Art

A conventional information recording medium has been commercialized as having a 4.7 GB/DVD-RAM, a large storage capacity, rewritable, phase-change information recording medium, usable for a data file and an image file (e.g., refer to Japanese Patent Application Laid-Open (JP-A) No. 2001-322357). The configuration of the information recording medium (DVD-RAM) is shown in FIG. 5. The information recording medium shown in FIG. 5 has a seven layer structure including a first dielectric layer 102, a first interface layer 103, a recording layer 4, a second interface layer 105, a second dielectric layer 106, a light absorption adjusting layer 7, and a reflective layer 8 on one surface of a substrate 1 in this order. With respect to this information recording medium, the first dielectric layer 102 is positioned closer to the laser incident side than the second dielectric layer 106. The first interface layer 103 has the same positioning relation with the second interface layer 105. As described above, in this specification, when an information recording medium includes two or more layers having the same function, ordinal numbers; first, second, third, and so on; are assigned in this order from the laser incident side.

The first dielectric layer 102 and the second dielectric layer 106 have the functions of adjusting the optical distance so as to increase optical absorption efficiency of the recording layer 4 and increasing the difference in reflectance between the crystal phase of the recording layer 4 and the amorphous phase of the recording layer 4 so as to magnify the signal amplitude. A mixed material of ZnS and $SiO_2$ (in this specification, referred to as $ZnS$—$SiO_2$ in some cases) which has been conventionally used for a material of a dielectric layer is an amorphous material and has a low thermal conductivity, transparency, and a high refractive index. Further, ZnS—$SiO_2$ has a high film deposition speed at the time of film deposition and is also excellent in mechanical properties and resistance to humidity. In this manner, ZnS—$SiO_2$ is an excellent material for a dielectric layer of an information recording medium.

If the thermal conductivity of the first dielectric layer 102 and the second dielectric layer 106 is low, the heat generated at the time of laser incidence upon the recording layer 4 is unlikely to be diffused in the in-plane direction of the dielectric layer 102 or 106 and smoothly diffused in the thickness direction from the recording layer 4 to the reflective layer 8. Particularly, when the thermal conductivity of the second dielectric layer 106 is low, the recording layer 4 and the reflective layer 8 are more thermally insulated by the second dielectric layer 106. The larger the extent of thermal insulation between the recording layer 4 and the reflective layer 8 is, the shorter the time for cooling the recording layer 4, and amorphous marks (recording marks) tend to be formed more easily. When the recording marks are difficult to form, it is required to carry out recording with high peak power. In contrast, when the recording marks are easy to form, it is possible to carry out recording with low peak power. As described above, when the thermal conductivity of the dielectric layers 102 and 106 is low, it is possible to carry out recording with low peak power and accordingly the recording sensitivity of the information recording medium can be increased.

When the thermal conductivity of the dielectric layers 102 and 106 is high, high peak power recording is required and accordingly the recording sensitivity of the information recording medium is decreased. The dielectric layers 102 and 106 of the information recording medium exist in form of such a thin film so as to make it impossible to precisely measure thermal conductivity. Therefore, the present inventors employ recording sensitivity of an information recording medium as a relative judgment standard to know the degree of the thermal conductivity of a dielectric layer.

The recording layer 4 is formed using a material containing Ge—Sn—Sb—Te and to be crystallized at a high speed. An information recording medium containing such a material for the recording layer 4 has not only excellent initial recording performance but also an excellent recording conservation property and a rewriting conservation property. A rewritable phase-change type information recording medium performs recording, erasing, and rewriting based on reversible phase change caused between the crystal phase and the amorphous phase of the recording layer 4. If high power laser light (peak power) is applied to the recording layer 4 and the recording layer is quickly cooled, the irradiated portion becomes an amorphous phase thereby forming recording marks. If lower power laser light (bias power) is applied to increase the temperature of the recording layer 4 and the recording layer is gradually cooled, the irradiated portion becomes a crystal phase thereby erasing the recorded information. Application of laser light with modulated power between the peak power level and the bias power level to the recording layer makes it possible to erase already recorded information and simultaneously rewrite new information. The repeated rewriting performance can be expressed as the maximum number of rewriting to be repeated to the extent that the jitter value is within a practically usable range. It can be said that the repeated rewriting performance is better as the repeat count is higher. Particularly, an information recording medium for a data file is desired to have excellent repeated rewriting performance.

The first interface layer 103 and the second interface layer 105 have a function of preventing mass transfer generated between the first dielectric layer 102 and the recording layer 4 and between the second dielectric layer 106 and the recording layer 4 (e.g., refer to JP-A No. 10-275360 and International Publication Pamphlet No. 97/34298). That is, a sulfur atom (hereafter referred to as an S atom) of ZnS—$SiO_2$ contained in the first and the second dielectric layers 102 and 106 is prevented from diffusing in the recording layer 4 during repeated rewriting by laser irradiation to the recording layer 4. It has been known that if a large quantity of S atoms is diffused to the recording layer 4, the reflectance of the recording layer 4 is decreased and the repeated rewiring performance is deteriorated (e.g., refer to N. Yamada, et al. Japanese Journal of Applied Physics, vol. 37, 1998, pp. 2104-2110).

The light absorption adjusting layer 107 has functions of adjusting the ratio Ac/Aa of the optical absorbance Ac when the recording layer 4 is in a crystalline state and the optical absorbance Aa when the recording layer 4 is in an amorphous state and suppressing the strain of a mark form at the time of rewriting. The reflective layer 8 has an optical function of increasing the amount of light to be absorbed in the recording layer 4 and a thermal function of quickly diffusing heat generated in the recording layer 4 and quickly cooling the recording layer 4 to make the recording layer 4 easy to be amorphous. The reflective layer 8 also has a function of protecting the multilayer film from the environments in which the film is used.

As described above, the information recording medium shown in FIG. 5 has a configuration formed by laminating seven layers respectively having the above-mentioned functions, so that the information recording medium retains excellent repeated rewriting performance and high reliability even having a storage capacity as large as 4.7 GB.

As described above, an interface layer for reducing mass transfer is inevitably needed between a recording layer and a dielectric layer to assure the repeated rewriting performance of an information recording medium.

However, in consideration of the cost of the medium, it is desirable for the medium to have a less number of constituent layers even by a single. It is because that decrease of the number of layers can save the material cost, make a production apparatus compact and simple, and increase the productivity by shortening the production time and consequently cutting cost of the recording medium.

Further, the interface layers are very thin layers with a thickness of 2 nm to 5 nm and weak in the structure. Therefore, it is likely that the film is broken during the time of repeated recording and as a result, atom diffusion is caused easily. Consequently, elimination of the interface layers is desirable in terms of the stability of the information recording medium.

SUMMARY OF THE INVENTION

It is an object of the present invention to provide an information recording medium having high reliability and good repeated rewriting performance even when no interface layer is formed.

The information recording medium of the present invention is an information recording medium for recording and/or reproducing information by applying light or electric energy and having a material layer containing at least one element selected from a group GM consisting of Sn and Ga, at least one element selected from a group GL consisting of Ta and Y, and oxygen.

A method for manufacturing an information recording medium of the present invention involves forming a material layer by a sputtering method using a sputtering target containing at least one element selected from the group GM consisting of Sn and Ga, at least one element selected from the group GL consisting of Ta and Y, and oxygen.

According to the information recording medium and the method for manufacturing the same of the present invention, an information recording medium with a decreased number of the constituent layers, excellent in the recording sensitivity and the repeated rewriting performance, and having high reliability can be manufactured with great productivity.

Further, since a material to be used for the material layer in the information recording medium of the present invention has a low thermal conductivity and high adhesiveness to a recording layer, if it is used for a layer for thermally insulating a recording layer in an information recording medium in which electric energy is applied, the phase change of the recording layer can be caused with less electric energy.

DETAILED DESCRIPTION OF THE INVENTION

Figure 1:
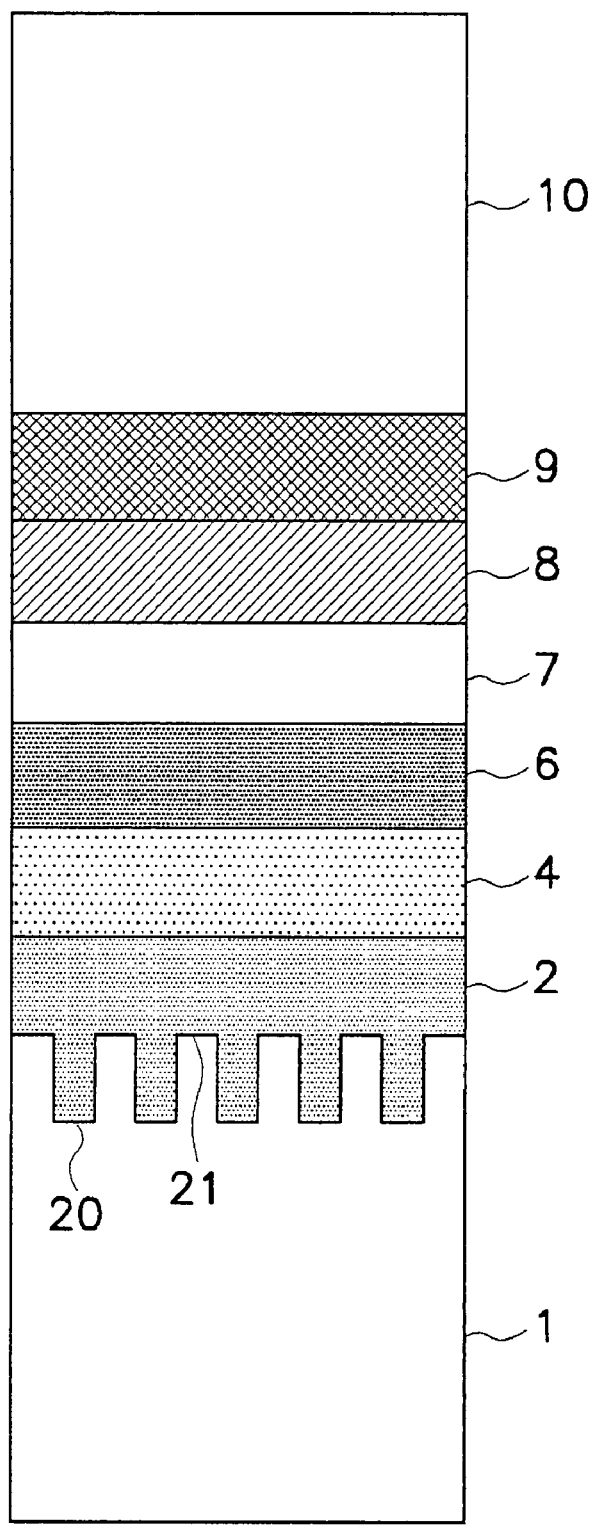
FIG. 1 is a partial cross-section of one example of an information recording medium of an embodiment 1 of the present invention.

When $ZnS$—$SiO_2$ is used for a material layer, if the material layer is formed to be in contact with a recording layer, an S atom of $ZnS$—$SiO_2$ contained in the material layer is diffused in the recording layer and decreases reflectance of the recording layer during repeated rewriting by applying laser light to the recording layer and thus the repeated rewriting performance is deteriorated. Therefore, just like an information recording medium shown in FIG. 5, in order to assure the repeated rewriting performance of an information recording medium, an interface layer is indispensably required for suppressing mass transfer between the recording layer and the material layer. However, in consideration of the cost of the medium, it is desirable for the medium to have a less number of constituent layers even by a single. Therefore, the present inventors investigated the possibility of eliminating at least one of the first interface layer and the second interface layer as a method for lessening the number of layers.

To eliminate an interface layer, it is required to form a material layer with a material which does not cause mass transfer of S, that is, a material system free from an S atom. Further, with respect to a material for the material layer, the material is desired to have the following properties: (1) to efficiently carry out recording by sufficiently assuring optical absorption in the recording layer and to carry out excellent reproduction of the recorded information by sufficiently assuring reflected light, the material has transparency to a certain extent to the light with a wavelength at which recording and reproduction are carried out; (2) the material can provide recording sensitivity equal to or higher than that of an information recording medium with a seven layer structure having an interface layer; (3) the material is thermally stable and has a high melting point without being melted even by repeated rewriting; (4) the material has a high film deposition speed at the time of film deposition in order to ensure productivity; and (5) the material is excellent in reliability.

In the information recording medium of the present invention, the material layer formed adjacently to the recording layer contains at least one element selected from a group GM consisting of Sn and Ga, at least one element selected from a group GL consisting of Ta and Y, and oxygen. Formation of the material layer using such materials makes it possible to increase the film deposition speed equal to or higher than that of $ZnS$—$SiO_2$ used for a dielectric layer of a conventional information recording medium. Since S is not included among the elements composing the material layer, there is no need to form an extra interface layer in the case of using the material layer for the dielectric layer. It is also made possible to form a dielectric layer transparent to the light with a wavelength to be used for recording and reproducing information.

Further, if such a material layer is used for a dielectric layer, even when a dielectric layer is formed directly on the top and down faces of the recording layer without interposing an interface layer therebetween, sufficient recording sensitivity and rewriting performance can be assured. The information recording medium of the present invention is a medium for recording and reproducing information by applying light or electric energy. Generally, light irradiation is carried out by applying laser light (that is, laser beam) and application of electric energy is carried out by applying voltage to the recording layer. Hereinafter, materials for the material layer composing the information recording medium of the present invention will be described in more detail.

In the information recording medium of the present invention, the material layer may contain a material defined by the following formula:

$$M_{h1}O_{i1}L_{j1} \text{ (atom percent)} \quad \text{(formula 1)}$$

wherein M denotes at least one element selected from the group GM; L denotes at least one element selected from the group GL; and h1, i1, and j1 satisfy the following; $5 \leq h1 \leq 40$, $40 \leq i1 \leq 70$, $0 \leq j1 \leq 35$, and $h1+i1+j1=100$.

Herein "atom percent" means that the formula 1 is a composition formula consisting of an M atom, an oxygen atom, and an L atom in the total (100%) on the basis of the number of atoms. The expression "atom percent" in formulas to be described below means the same. The formula 1 expresses the substance by counting only an M atom, an oxygen atom, and an L atom contained in the material layer. Accordingly, the material layer containing the material defined by the formula 1 may contain a component other than these atoms. Further, in the formula 1, respective atoms can exist as any compounds. The reason why the material is specified by such a formula is that it is difficult to define a composition of compounds at the time of investigating the composition of the layer formed in form of a thin film and actually, only the element composition (that is, the ratio of respective atoms) is often measured. With respect to the material defined by the formula 1, it is supposed that the element M and the element L almost all exist in form of oxides together with an oxygen atom.

When the information recording medium of the present invention is an optical information recording medium, it is preferable to form one or both dielectric layer(s) among the two dielectric layers adjacent to the recording layer by using a material layer containing an element selected from the group GM, an element selected from the group GL, and oxygen (hereinafter, referred to as an oxide type material layer). For example, in the case of a phase-change type recording medium, the melting point of the main material system composing the recording layer is about 500 to 700° C., the oxides of elements belonging to the group GM, that is, oxides of Sn and Ga, have good resistance to humidity and a melting point of 1000° C. or higher and are excellent in thermal stability. A dielectric layer containing a material excellent in the thermal stability is unlikely to be deteriorated and excellent in durability even when information is repeatedly rewritten in an information recording medium containing this dielectric layer.

Figure 5:
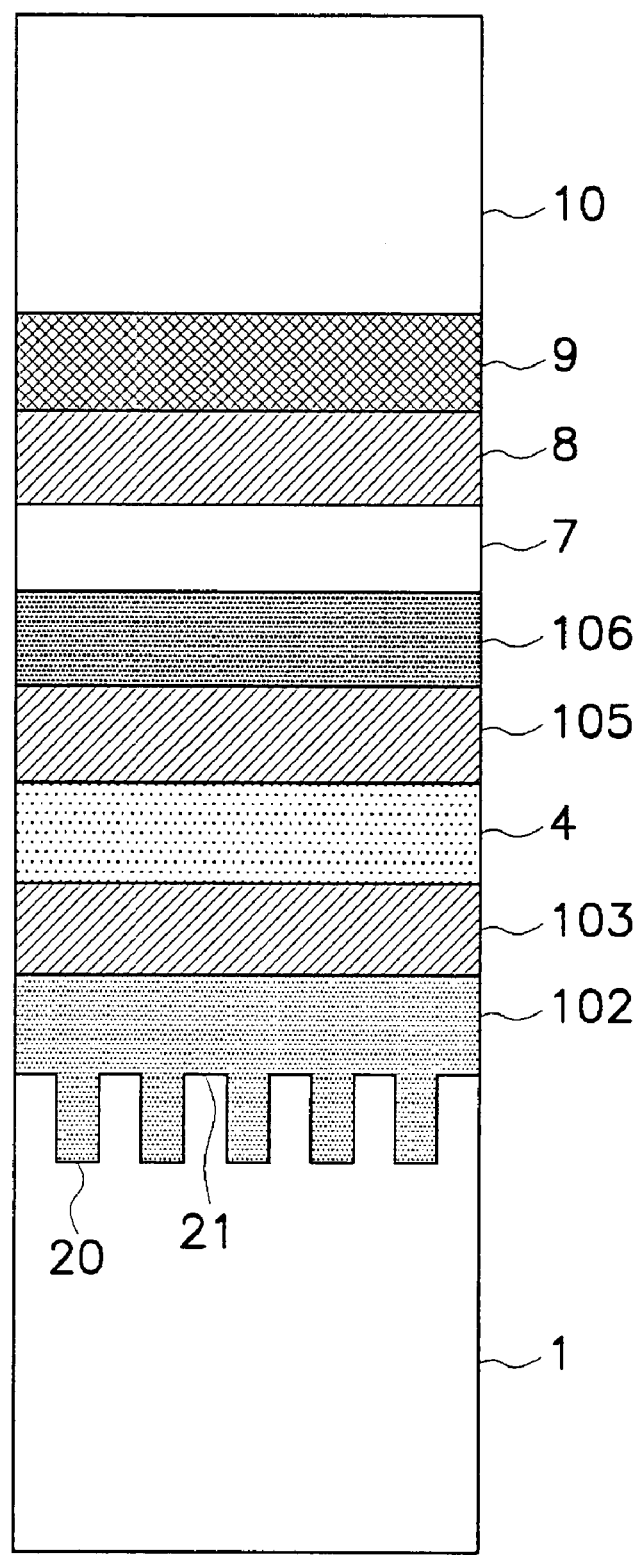
FIG. 5 is a partial cross-section of one example of a conventional information recording medium.

On the other hand, oxides of elements belonging to the group GL, that is, oxides of Ta and Y, are excellent in light transmittance in a wide wavelength range and mixing the oxides with the above-mentioned oxides of the group GM is effective in lowering the recording sensitivity and improving the rewriting durability as a result of little light absorption. Further, since oxides of the group GL have higher heat resistance than the oxides of the group GM, they are effective in improving the heat resistance of the material layer and thus preferable in terms of high speed recording capability and high density. The above-mentioned oxides are all good in the adhesiveness to a recording layer formed using chalcogenide materials. Accordingly, with respect to an information recording medium having such an oxide material layer as a dielectric layer, the following effects can be achieved:

(1) since a dielectric layer free from S can be formed while being closely adhered to a recording layer, no interface layer is required;

(2) the information recording medium is provided with durability to repeated rewriting and resistance to humidity equal to or better than those of a conventional information recording medium shown in FIG. 5; and (3) since the dielectric layer is excellent in light transmittance and has a complicated structure containing a plurality of oxides with different valences in a mixed state, the thermal conductivity of the dielectric layer is lowered and accordingly, the recording layer tends to be cooled easily and the recording sensitivity is increased.

If the layer containing the material defined by the formula 1 is employed for either one or both of the two dielectric layers neighboring to the recording layer of the information recording medium, the information recording medium having better recording sensitivity and excellent repeated rewriting performance and excellent in productivity can be manufactured at a low cost. Further, the information recording medium can satisfy requirements for further high recording density and high recording speed.

With respect to the above-mentioned oxide type material layer, if M of the formula 1 denotes Sn, it is more preferable. If M contains Sn and Ga, it is furthermore preferable. If L of the formula 1 denotes Y, it results in improvement of the rewriting performance and assurance of the recording sensitivity and therefore is preferable.

As described above, with respect to the above-mentioned oxide type material layer, at least one element selected from the group GM consisting of Sn and Ga and at least one element selected from the group GL consisting of Ta and Y are all supposed to coexist with oxygen in form of oxides and the layer is specified as a layer containing these elements. In the material layer specified as described above, the oxide group of at least one element selected from the group GM is contained preferably at a ratio of 30 mol % or higher and more preferably at a ratio of 50 mol % to 95 mol % on the basis (100 mol %) of the total amount of the oxide group and the oxide group of at least one element selected from the group GL.

Herein, the term "oxide group" is employed for collectively referring to all oxides when the two elements are selected from the group GM and two kinds of oxides are contained in the layer. Or, the term "oxide group" also means only one oxide when only a single element is selected from the group GM and one kind of oxide is contained in the layer. That is the same for the elements selected from the group GL. In other words, the oxide type material layer may contain a compound other than the above-specified compounds (such a compound is also referred to as a "third component") up to 10 mol % because of the thermal stability of the material layer, recording sensitivity, rewriting performance, and prevention of decrease of resistance to humidity.

Further, the dielectric layer formed using the above-specified material may contain not more than several mol % of impurities and a slight amount of elements of the material composition composing the neighboring layers.

The ratio of the oxide group of the elements selected from the group GM may be 30 mol % or higher in order to suppress decrease of the film deposition speed. The oxide group of the elements selected from the group GL can form the material layer without decreasing the film deposition speed so much in the case of being mixed with oxides.

Further, with respect to the information recording medium of the present invention, the material layer may contain an oxide of at least one element selected from the group GM, preferably at least one oxide selected from $SnO_2$ and $Ga_2O_3$ and an oxide of at least one element selected from the group GL, preferably at least one oxide selected from $Ta_2O_5$ and $Y_2O_3$ and specifically, the material layer may contain a material defined by the following formula:

$$(D)_x(A)_{100-x} \text{ (mol \%)} \quad \text{(formula 2)}$$

wherein D denotes at least one oxide selected from $SnO_2$ and $Ga_2O_3$; A denotes at least one oxide selected from $Ta_2O_5$ and $Y_2O_3$; and x satisfies $30 \leq x \leq 95$. $SnO_2$ and $Ga_2O_3$ are good in resistance to humidity and both have a melting point as high as 1000° C. or higher, high thermal stability and a high film deposition speed. If being mixed with the above-mentioned oxide group, $Ta_2O_5$ and $Y_2O_3$ are excellent in light transmittance and accordingly effective in lowering the recording sensitivity and improve the rewriting durability. Further, due to low cost, these oxides are suitable for practical use. The preferable ratio of the respective compounds is defined as x as shown in the above-mentioned formula. Use of the oxide type material layer for the dielectric layer in contact with the recording layer makes it possible to eliminate an interface layer between the dielectric layer and the recording layer. Accordingly, the information recording medium containing such a material layer as the dielectric layer is provided with good repeated recording performance, resistance to humidity, recording sensitivity, and recording and rewriting conservation properties.

The preferable ratio is defined as x as described above. To the extent that the film deposition speed is assured to be proper for production, the above-mentioned D is preferably added at a ratio of 30 mol % or higher.

The composition analysis of the oxide type material layer existing in the information recording medium of the present invention can be carried out using, for example, an x-ray micro-analyzer. In that case, the composition is defined on the basis of atomic concentrations of respective elements.

The oxide type material layer described above is preferable to be formed in contact with the recording layer in the information recording medium of the present invention and may be formed in contact with both faces of the recording layer. The material layer of the information recording medium of the present invention may exist as an interface layer positioned between the recording layer and the dielectric layer.

The information recording medium of the present invention is preferable to reversibly cause phase change in the recording layer. That is, the information recording medium is preferably provided as a rewritable information recording medium. More specifically, the recording layer in which phase change is reversibly caused is preferably contains at least one material selected from Ge—Sb—Te, Ge—Sn—Sb—Te, Ge—Bi—Te, Ge—Sn—Bi—Te, Ge—Sb—Bi—Te, Ge—Sn—Sb—Bi—Te, Ag—In—Sb—Te, and Sb—Te. These are all fast crystallization materials. Accordingly, if the recording layer is formed using these materials, it is possible to obtain an information recording medium capable of carrying out recording at a high density and high transfer speed and also excellent in terms of reliability (specifically, recording conservation or rewriting conservation property).

In the information recording medium of the present invention, it is also desirable that the recording layer has a thickness of 15 nm or thinner for reversibly causing phase change in the recording layer. Accordingly, the heat generated in the recording layer is diffused in the plane and is unlikely to be diffused in the thickness direction, so that inhibition of the rewriting of information can be prevented.

The information recording medium of the present invention may have a configuration in which a first dielectric layer, a recording layer, a second dielectric layer, and a reflective layer are formed on one surface of a substrate in this order. An information recording medium having this configuration is a medium in which recording is carried out by light irradiation. In this specification, "first dielectric layer" means a dielectric layer at a position closer to the incident light and "second dielectric layer" means a dielectric layer at a position farther to the incident light. That is, the applied light reaches the second dielectric layer from the first dielectric layer via the recording layer. The information recording medium with this configuration is employed for the case of optical recording and reproducing with laser light with a wavelength around 660 nm, for example. When the information recording medium of the present invention has this configuration, at least one dielectric layer among the first dielectric layer and the second dielectric layer is preferable to be formed using the above-mentioned oxide type material layer. Further, both dielectric layers may be formed in form of the above-mentioned material layers or may be material layers with the same composition or may be material layers with different compositions.

As one embodiment of the information recording medium having this configuration is exemplified an information recording medium including a first dielectric layer, an interface layer, a recording layer, a second dielectric layer, a light absorption adjusting layer, and a reflective layer formed on one surface of a substrate in this order and the second dielectric layer is formed in the above-mentioned oxide type material layer and set in contact with the recording layer.

The information recording medium of the present invention may have a configuration formed by forming a reflective layer, a second dielectric layer, a recording layer, and a first dielectric layer formed on one surface of a substrate in this order. This configuration is employed particularly when the thickness of the substrate into which the light enters is required to be thin. When the recording and reproduction is carried out by laser light with a short wavelength around 405 nm, the numerical aperture NA of the objective lens is increased to, for example, 0.85 to shallow the focal point position and in this case the information recording medium with this configuration is employed. To use such a wavelength and a numerical aperture NA, it is required to adjust the thickness of the substrate into which the light enters to be about 60 to 120 μm but it is difficult to form the layers on the surface of the substrate with such a thin thickness. Accordingly, the information recording medium with this configuration is specified as one using a substrate into which no light enters as a support and having the reflective layer and the like successively formed on one surface of the support.

When the information recording medium of the present invention has this configuration, at least one dielectric layer among the first dielectric layer and the second dielectric layer is the above-mentioned oxide type material layer. When both dielectric layers are the above-mentioned oxide type material layers, both dielectric layers may be layers having the same composition or may be layers with different compositions.

As one embodiment of the information recording medium having this configuration is exemplified an information recording medium including a reflective layer, a light absorption adjusting layer, a second dielectric layer, a recording layer, an interface layer, and a first dielectric layer formed on one surface of a substrate in this order and the second dielectric layer is the above-mentioned oxide type material layer.

The information recording medium of the present invention may include two or more recording layers. Such an information recording medium has a one-side two-layer structure in which two recording layers are laminated on one surface side of a substrate while a dielectric layer and an intermediate layer are interposed therebetween. Alternatively, recording layers may be formed on both sides of a substrate. With these configurations, the storage capacity can be increased.

The information recording medium of the present invention may have a structure in which the recording layers themselves are laminated in a plurality of layers. This structure may be employed when the recording layers themselves need to be laminated to assure the properties in order to satisfy the high density and high speed recording and an oxide type material layer may be formed in contact with at least one of the interface of the laminated recording layers.

Next, a method for manufacturing an information recording medium of the present invention will be described.

The method for manufacturing an information recording medium of the present invention involves a step of forming the material layer contained in the information recording medium of the present invention by a sputtering method. The sputtering method is capable of forming the material layer having approximately the same composition as that of a sputtering target. Accordingly, this method makes it possible to easily form an oxide type material layer with a desired composition by properly selecting a sputtering target.

More specifically, as a sputtering target can be employed those containing a material defined by the following formula:

$$M_{h2}O_{i2}L_{j2} \text{ (atom percent)} \quad \text{(formula 3)}$$

wherein M denotes at least one element selected from the group GM; L denotes at least one element selected from the group GL; and h2, i2, and j2 satisfy the following; $5 \leq h2 \leq 40$, $40 \leq i2 \leq 70$, $0 \leq j2 \leq 35$, and $h2+i2+j2=100$.

The formula 3 is equivalent to a formula that expresses the material in which almost all of the elements denoted by M and L exist in form of oxides in form of an element composition. Use of this sputtering target makes it possible to form a dielectric layer containing the material defined by the formula 1.

If M of the formula 3 denotes Sn, it is preferable. If M contains Sn and Ga, it is more preferable. Further, if L denotes Y, the rewriting performance can be improved and the recording sensitivity can be assured and therefore, it is more preferable.

More particularly, a preferable sputtering target to be used contains an oxide of at least one element selected from the group GM, preferably at least one oxide selected from $SnO_2$ and $Ga_2O_3$, and an oxide of at least one element selected from the group GL, preferably at least one oxide selected from $Ta_2O_5$ and $Y_2O_3$. Such a sputtering target may contain a material defined by the following formula:

$$(D)_x(A)_{100-x} \text{ (mol \%)} \quad \text{(formula 4)}$$

wherein D denotes at least one oxide selected from $SnO_2$ and $Ga_2O_3$; A denotes at least one oxide selected from $Ta_2O_5$ and $Y_2O_3$; and x satisfies $30 \leq x \leq 95$.

In the above-mentioned oxide type material layer, if D of the formula 4 denotes $SnO_2$, it is preferable. If D contains $SnO_2$ and $Ga_2O_3$, it is more preferable. Further, if A of the formula 4 denotes $Y_2O_3$, the rewriting performance is improved and therefore it is more preferable.

Further, the present inventors have confirmed that the element composition obtained by analyzing the sputtering target having the composition as defined above by an x-ray microanalyzer is approximately the same as the element composition calculated from the displayed composition (that is, the composition indication (nominal composition) is proper). Accordingly, the sputtering target provided as the oxide type material is also preferably usable for the method for manufacturing the information recording medium of the present invention.

The sputtering target provided as an oxide type material is further satisfactory if it contains the oxide group of element(s) selected from the group GM at a ratio of 30 mol % or higher since the productivity is high and more preferably at a ratio of 50 mol % to 95 mol % on the basis of the total amount (100 mol %) of the oxide group of element(s) selected from the group GM and the oxide group of at least one element selected from the group GL. Accordingly, the formed oxide type material layer also contains the oxide group of the element of the group GM at 30 mol % or higher and accordingly an information recording medium causing the above-mentioned prescribed effects can be obtained.

With respect to the information recording medium of the present invention, as described above, the oxide type material layer defined by the formula 1 or the formula 2 may be formed in contact with at least one interface of the recording layer.

Accordingly, it is needless to say that, for example, in relation to the design of a manufacturing apparatus, or in relation to the production of a sputtering target, if it is not proper or difficult to use the sputtering target with the material composition defined by the formula 3 or the formula 4, a plurality of sputtering targets may be used to accordingly form the material layer defined by the formula 1 or the formula 2. As a method therefor, for example, specifically, sputtering is carried out by using a sputtering target containing $SnO_2$ and a sputtering target containing $Ta_2O_5$ to achieve a desired mixing ratio.

Hereinafter, embodiments of the present invention will be described with reference to drawings. The following embodiments are illustrative and the present invention is not limited thereto.

Embodiment 1

As an embodiment 1 of the present invention, one example of an information recording medium in which information is recorded and reproduced using laser light will be described. A partial cross-section of the information recording medium is shown in FIG. 1.

As shown in FIG. 1, the information recording medium of the present embodiment has a configuration formed by laminating a first dielectric layer 2, a recording layer 4, a second dielectric layer 6, a light absorption adjusting layer 7 and a reflective layer 8 on one surface of a substrate 1 in this order and adhering a laminate substrate 10 to the reflective layer 8 by an adhesive layer 9. That is, the reflective layer 8 is formed on the light absorption adjusting layer 7; the light absorption adjusting layer 7 is formed on the second dielectric layer 6; the second dielectric layer 6 is formed on the recording layer 4; and the recording layer 4 is formed on the first dielectric layer 2. The information recording medium with this configuration can be used as a 4.7 GB/DVD-RAM for recording and reproducing information with laser beam having a wavelength around 660 nm. To the information recording medium with this configuration, laser light is applied from the substrate 1 side and recording and reproducing of information can be carried out by the incident laser light. The information recording medium of the present embodiment differs from a conventional information recording medium shown in FIG. 5 in that no interface layer is formed between the recording layer 4 and the first and the second dielectric layers 2 and 6.

The substrate 1 is generally a transparent disk-like plate. In the substrate 1, as shown in FIG. 1, a guide groove for leading laser light may be formed in the surface on the side where the first dielectric layer 2 and the recording layer 4 are formed. When the guide groove is formed in the substrate 1, groove parts and land parts are formed in a cross-section of the substrate 1. It may be said that the groove parts are positioned between neighboring two land parts. Accordingly, the surface of the substrate 1 in which the guide groove is formed has summit faces and bottom faces continued through the side walls. For convenience, a face on the side near the laser light in the laser light direction is called as a "groove face" and a face on the side far from the laser light is called as a "land face" in this specification. In FIG. 1, bottom faces 20 of the guide groove of the substrate 1 are defined as groove faces and summit faces 21 are defined as land faces. This is the same in the information recording medium shown in FIG. 2, which will be described later as an embodiment 2.

The step height of the groove faces 20 and the land faces 21 of the substrate 1 is preferably 40 nm to 60 nm. Additionally, with respect to the substrate 1 composing the information recording medium shown in FIG. 2, which will be described later, the step height of the groove faces 20 and the land faces 21 is also preferably within this range. Further, in the substrate 1, the surface on which other layers are not formed is preferable to be smooth. A material for the substrate 1 may be materials having light transmittance, for example, resins such as polycarbonates, amorphous polyolefins, and polymethyl methacrylate (PMMA) and glass. In consideration of formability, cost, and the mechanical strength, polycarbonates are preferable to be used. With respect to the information recording medium of the present embodiment, the thickness of the substrate 1 is around 0.5 to 0.7 mm.

The recording layer 4 is a layer in which recording marks are formed by causing phase change between a crystal phase and an amorphous phase by light irradiation or electric energy application. If the phase change is reversible, erasing and rewriting can be carried out. A material that causes the reversible phase change is preferably Ge—Sb—Te or Ge—Sn—Sb—Te, which is a fast crystallization material. More specifically, in the case of Ge—Sb—Te, those having a GeTe—$Sb_2Te_3$ quasi-binary composition are preferable and in this case it is preferable to satisfy $4Sb_2Te_3 \leqq GeTe \leqq 50Sb_2Te_3$. Accordingly, change of the amount of the reflected light before and after recording can be increased; the quality of a read out signal is prevented from deteriorating; the volume change between the crystal phase and the amorphous phase can be suppressed; and the repeated rewriting performance can be improved. Ge—Sn—Sb—Te achieves a higher crystallization speed than Ge—Sb—Te. Ge—Sn—Sb—Te is a material obtained by partially replacing Ge of, for example, a GeTe—$Sb_2Te_3$ quasi-binary composition with Sn. In the recording layer 4, the content of Sn is preferably 20 atom percent or lower. Accordingly, it is made possible to avoid deterioration of the stability of the amorphous phase and decrease of the reliability of the recording marks due to too high a crystallization speed. The content of Sn can be adjusted in accordance with the recording conditions.

The recording layer 4 can be formed using a Bi-containing material such as Ge—Bi—Te, Ge—Sn—Bi—Te, Ge—Sb—Bi—Te, or Ge—Sn—Sb—Bi—Te. Bi is easier to be crystallized than Sb. Accordingly, replacement of at least a portion of Sb of Ge—Sb—Te or Ge—Sn—Sb—Te by Bi can improve the crystallization speed of the recording layer. Ge—Bi—Te is a mixture of GeTe and $Bi_2Te_3$. The mixture is preferable to satisfy $8Bi_2Te_3 \leqq GeTe \leqq 25Bi_2Te_3$. Accordingly, deterioration of the record conservation property due to decrease of the crystallization temperature can be suppressed and deterioration of the repeated rewriting performance due to considerable volume change between the crystal phase and the amorphous phase can be suppressed.

Ge—Sn—Bi—Te is a substance obtained by partially replacing Ge of Ge—Bi—Te with Sn. The replacement concentration of Sn may be adjusted, so that the crystallization speed can be controlled in accordance with the recording conditions. Replacement with Sn is suitable for fine adjustment of the crystallization speed of the recording layer 4 as compared with replacement with Bi. In the recording layer 4, the Sn content is preferably 10 atom percent or lower. Accordingly, deterioration of the stability of the amorphous phase and deterioration of the conservation property of recording marks due to too high a crystallization speed can be suppressed.

Ge—Sn—Sb—Bi—Te is a substance obtained by partially replacing Ge of Ge—Sb—Te with Sn and further partially replacing Sb with Bi. The substance is equivalent of a mixture of GeTe, SnTe, $Sb_2Te_3$, and $Bi_2Te_3$. With respect to this mixture, the crystallization speed can be controlled in accordance with recording conditions by adjusting the concentration of replacement with Sn and the concentration of replacement with Bi. Ge—Sn—Sb—Bi—Te is preferable to satisfy $4(Sb-Bi)_2Te_3 \leqq (Ge-Sn)Te \leqq 25(Sb-Bi)_2Te_3$. Accordingly, it is made possible to avoid deterioration of the quality of a read out signal due to the decreased change of the amount of the reflected light before and after recording or deterioration of the repeated rewriting performance due to considerable increase of the volume change between the crystal phase and the amorphous phase. Further, deterioration of the repeated rewriting performance due to considerable increase of the volume change between the crystal phase and the amorphous phase can be suppressed. In the recording layer 4, the content of Bi is preferably 10 atom percent or lower, and the content of Sn is preferably 20 atom percent or lower. It is because that if the contents of Bi and Sn are respectively within these ranges, a good conservation property of recording marks can be obtained.

Other materials which can cause reversible phase change are, for example, Ag—In—Sb—Te, Ag—In—Sb—Te—Ge, and Sb—Te containing 70 atom percent or more of Sb.

It is preferable to use as an irreversible phase-change material, for example, $TeO_x + \alpha$ ($\alpha$ denotes Pd, Ge, or the like). An information recording medium in which the recording layer 4 contains the irreversible phase-change material is capable of recording only one time and is of a so-called write-once type. With respect to such an information recording medium, there is a problem that atoms in the dielectric layer are diffused in the recording layer due to the heat at the time of recording thereby resulting in decrease of the quality of a signal. Accordingly, the present invention is preferably applicable not only to the rewritable information recording medium but also to a write-once type information recording medium.

When the recording layer 4 contains a material that causes reversible phase change, as described above, the thickness of the recording layer 4 is preferably 15 nm or thinner and more preferably 12 nm or thinner.

The first dielectric layer 2 and the second dielectric layer 6 in the present embodiment are oxide type material layers containing an oxide of at least one element selected from the group GM consisting of Sn and Ga and an oxide of at least one element selected from the group GL consisting of Ta and Y.

Generally, a material to be used for the dielectric layer composing an information recording medium is required to have the following properties: (1) having transparency (having an extinction coefficient of 0.1 or lower, more preferably 0.05 or lower); (2) providing recording sensitivity equal to or higher than that of a configuration in which an interface layer is formed between a dielectric layer and a recording layer; (3) having a high melting point and therefore, not being melted at the time of recording; (4) having a high film deposition speed; and (5) having good adhesiveness to a recording layer 4 containing a chalcogenide material. The transparency is a required property for making the laser light entering from the substrate 1 side reach the recording layer 4. This property is particularly required for the first dielectric layer 2 in the incident side. It is required to select the materials for the first and the second dielectric layers 2 and 6 so as to give recording sensitivity equal to or higher than that of a conventional information recording medium in which an interface layer is positioned between a dielectric layer containing $ZnS$—$SiO_2$ and a recording layer. Further, the high melting point is a required property for assuring that the materials for the first and the second dielectric layers 2 and 6 are prevented from contamination in the recording layer 4 when the laser light of the peak power level is applied. The property is required for both of the first and the second dielectric layers 2 and 6. If the materials of the first and the second dielectric layers 2 and 6 are mixed into the recording layer 4, the repeated rewriting performance is considerably deteriorated. The good adhesiveness to the recording layer 4 containing a chalcogenide material is a property required for assuring the reliability of the information recording medium and the property is required for both of the first and the second dielectric layers 2 and 6. To obtain good productivity, a high film deposition speed is also required.

Among the components contained in the above-mentioned oxide type material layer, oxides of the elements composing the group GM all has transparency, a high melting point, excellent thermal stability, and good adhesiveness to the recording layer. Accordingly, these compounds can assure good repeated rewriting performance of the information recording medium. Further, oxides of the elements composing the group GL have good adhesiveness to the recording layer and when being mixed with the oxides of the elements composing the group GM, the oxides lower the thermal conductivity and improve the recording sensitivity. At the same time, cracking and breakage of films due to repeated rewriting and recording are suppressed and consequently both of the recording sensitivity and the reliability of the information recording medium are satisfied. The oxides of the elements composing the group GM include, for example, $SnO_2$ and $Ga_2O_3$. Further, the oxides of the elements composing the group GL include, for example, $Ta_2O_5$ and $Y_2O_3$. In the following, examples of the refractive index n and the extinction coefficient k of the materials to laser light with a wavelength of 660 nm are shown in Table 1.

TABLE 1

| Material | $SnO_2$ | $Ga_2O_3$ | $Y_2O_3$ | $(SnO_2)_{50}(Ga_2O_3)_{50}$ | $(SnO_2)_{80}(T_2O_3)_{20}$ |
|---|---|---|---|---|---|
| n | 2.18 | 1.92 | 2.08 | 1.99 | 2.16 |
| k | 0.01 | 0.00 | 0.00 | 0.00 | 0.01 |

It is possible to provide an information recording medium excellent in repeated rewriting performance and having good adhesiveness between the recording layer 4 and the first and the second dielectric layers 2 and 6 by formation of the first dielectric layer 2 and the second dielectric layer 6 in contact with the recording layer 4 by using materials free from S obtained by mixing these oxides. Further, thermal conduction can be suppressed in the first and the second dielectric layers 2 and 6 by making the structure of these layers complicated by mixing the oxides of the elements composing the group GL with the oxides of the elements composing the group GM. Accordingly, if the above-mentioned oxide type material layer is employed for the first and the second dielectric layers 2 and 6, the quick cooling effect of the recording layer can be improved and therefore, the recording sensitivity of the information recording medium can be increased.

Practical examples of such an oxide type material are materials defined by the formula 2: $(D)_x(A)_{100-x}$ (mol%). In this formula, D denotes at least one oxide selected from $SnO_2$ and $Ga_2O_3$ and A denotes at least one oxide selected from $Ta_2O_5$ and $Y_2O_3$. The reference character x, which shows a mixing ratio of the respective compounds, satisfies $30 \leq x \leq 95$. Consequently, it is possible to prevent decrease of the productivity due to a low film deposition speed or particularly, to prevent insufficient recording sensitivity due to a lowered effect of mixing A.

Formation of the dielectric layer using the above-mentioned oxide type material layer provides good recording sensitivity, rewriting performance, and reliability even if the dielectric layer is formed in contact with the recording layer.

The above-mentioned oxide type material layer may contain a third component besides the above-mentioned compounds and is particularly allowed to contain not more than several % of impurities. Further, even if a slight amount of elements of the composition of a layer to be formed adjacently are mixed, the thermal stability and the resistance to humidity are not changed and thus the layer may be used preferably for the first dielectric layer 2 and the second dielectric layer 6. The third component is those which are inevitably contained or those which are inevitably formed at the time of formation of the dielectric layer using the oxide type material layer. The third component may include, for example, dielectrics, metals, semi-metals, semiconductors, and/or non-metals.

The dielectrics contained as the third component are, for example, $Al_2O_3$, $Bi_2O_3$, $CeO_2$, $CoO$, $Cr_2O_3$, $CuO$, $Cu_2O$, $Dy_2O_3$, $Er_2O_3$, $FeO$, $Fe_2O_3$, $Fe_3O_4$, $HfO_2$, $Ho_2O_3$, $In_2O_3$, $La_2O_3$, $MnO$, $MgSiO_3$, $Nb_2O_5$, $Nd_2O_3$, $NiO$, $Sc_2O_3$, $SiO_2$, $Sm_2O_3$, $SnO$, $Tb_4O_7$, $TeO_2$, $TiO_2$, $VO$, $WO_3$, $Yb_2O_3$, $ZnO$, $ZrSiO_4$, $AlN$, $BN$, $CrB_2$, $LaB_6$, $ZrB_2$, $CrN$, $Cr_2N$, $HfN$, $NbN$, $Si_3N_4$, $TaN$, $TiN$, $VN$, $ZrN$, $B_4C$, $Cr_3C_2$, $HfC$, $Mo_2C$, $NbC$, $SiC$, $TiC$, $TaC$, $VC$, $W_2C$, $WC$, $ZrC$, $CaF_2$, $CeF_3$, $MgF_2$ or $LaF_3$.

The metals contained as the third component are, for example, Sc, Y, Ti, Zr, Hf, V, Nb, Ta, Cr, Mo, W, Mn, Fe, Ni, Pd, Pt, Cu, Ag, Au, Zn, La, Ce, Nd, Sm, Gd, Tb, Dy, or Yb.

The semi-metals and semiconductors contained as the third component are, for example, C or Ge and the non-metals are, for example, Sb, Bi, Te, or Se.

The first dielectric layer 2 and the second dielectric layer 6 may be formed from oxide material layers with mutually different compositions. The first dielectric layer 2 is preferable to be formed using a material so as to have a composition having more excellent resistance to humidity and for example, D in the formula 2 or the formula 4 is preferably $SnO_2$ and more preferably $SnO_2$ and $Ga_2O_3$. Further, A in the formula 2 or the formula 4 is more preferably $Y_2O_3$.

As described above, the oxide type material layer may be formed while the types of oxides and/or mixing ratios of these oxides are optimized in accordance with the desired functions.

With respect to the first dielectric layer 2 and the second dielectric layer 6, the respective optical path lengths (that is, the product nd of the refractive index n of the dielectric layer and the thickness d of the dielectric layer) may be changed, so that it is made possible to adjust the optical absorbance Ac (%) of the recording layer 4 in a crystal phase and the optical absorbance Aa (%) of the recording layer 4 in an amorphous phase; the light reflectance Rc (%) of the information recording medium when the recording layer 4 is in a crystal phase and the light reflectance Ra (%) of the information recording medium when the recording layer 4 is in an amorphous phase; and the phase difference $\Delta\phi$ of light between a portion where the recording layer 4 is in a crystal phase and a portion where the recording layer 4 is in an amorphous phase. To improve the signal quality by increasing the reproduced signal amplitude of the recording marks, it is desirable that the difference in reflectance (|Rc−Ra|) or the reflectance ratio (Rc/Ra) is high. Further, Ac and Aa are also preferable to be so high as to absorb laser light in the recording layer 4. The optical path lengths of the first dielectric layer 2 and the second dielectric layer 6 are determined so as to simultaneously satisfy these conditions. The optical path lengths for satisfying these conditions may be accurately determined by calculation based on, for example, a matrix method.

The above-described oxide type material layers have different refractive indexes according to its compositions. The optical path length nd is defined as nd=a$\lambda$ wherein n denotes the refractive index of the dielectric layer; d (nm) denotes the thickness; and $\lambda$ (nm) denotes the wavelength of the laser light. Herein, the reference character a denotes a positive numeral. To improve the signal quality by increasing the reproduced signal amplitude of the recording marks of the information recording medium, it is preferable to satisfy, for example, 15%$\leq$Rc and Ra$\leq$2%. Further, to eliminate or lessen the mark strain due to rewriting, it is preferable to satisfy 1.1$\leq$Ac/Aa. The optical path length (a$\lambda$) of the first dielectric layer 2 and the second dielectric layer 6 was calculated based on the matrix method so as to simultaneously satisfy these preferable conditions. The thickness d of the dielectric layer was calculated from the calculated optical path length (a$\lambda$), $\lambda$, and n. As a result, when the first dielectric layer 2 is formed using the material defined by the formulas 1 and 2 and having a refractive index n in a range from 1.8 to 2.4, it was found that the thickness is preferably 110 nm to 160 nm. When the second dielectric layer 6 is formed using the material, it was found that the thickness is preferably 35 nm to 60 nm.

As described above, the light absorption adjusting layer 7 has a function of adjusting the ratio Ac/Aa of the optical absorbance Ac when the recording layer 4 is in the crystal state and the optical absorbance Aa when the recording layer 4 is in the amorphous state and accordingly preventing the mark shape from straining at the time of rewriting. The light absorption adjusting layer 7 is preferable to be formed using a material having a high refractive index and capable of properly absorbing light. For example, the light absorption adjusting layer 7 can be formed using a material having a refractive index n from 3 to 5 both inclusive and an extinction coefficient k from 1 to 4 both inclusive. More specifically, it is preferable to use a material selected from amorphous Ge alloys such as Ge—Cr and Ge—Mo; amorphous Si alloys such as Si—Cr, Si—Mo, and Si—W; Te compounds; and crystalline metals such as Ti, Zr, Nb, Ta, Cr, Mo, W, SnTe, and PbTe, semi-metals, and semiconductor materials. The thickness of the light absorption adjusting layer 7 is preferably 20 nm to 50 nm.

The reflective layer 8 has an optical function of increasing the amount of the light to be absorbed in the recording layer 4 and a thermal function of quickly diffusing heat generated in the recording layer 4 and quickly cooling the recording layer 4 and making conversion into an amorphous state easy. The reflective layer 8 further has a function of protecting a multilayer film containing the recording layer 4 and the dielectric layers 2 and 6 from the environments in which the film is used. A material for the reflective layer 8 includes, for example, single metal materials with high thermal conductivity such as Al, Au, Ag, and Cu. To improve the resistance to humidity and/or to adjust the thermal conductivity or optical property (e.g. light reflectance, optical absorbance, or light transmittance), the reflective layer 8 may be formed using a single or a plurality of element(s) selected from the above-mentioned metal materials to which a single or a plurality of other element(s) is/are added. More specifically, alloy materials such as Al—Cr, Al—Ti, Ag—Pd, Ag—Pd—Cu, Ag—Pd—Ti, Ag—In, and Au—Cr may be used. These materials are all excellent in corrosion resistance and have a quickly cooling function. The above same object can be accomplished by forming two or more reflective layers 8. The thickness of the reflective layer 8 is preferably 50 to 180 nm and more preferably 60 to 120 nm.

The adhesive layer 9 may be formed using a material having high heat resistance and excellent adhesiveness, such as UV-curing resins. More specifically, photo-curing materials containing an acrylate resin or a methacrylate resin as a main component, materials containing an epoxy resin as a main component, and hot melt materials can be used. If necessary, prior to forming the adhesive layer 9, a protection coat layer containing a UV-curing resin with a thickness of 2 to 20 $\mu$m may be formed on the surface of the reflective layer 8. The thickness of the adhesive layer 9 is preferably 15 to 60 $\mu$m and more preferably 20 to 40 $\mu$m.

The laminate substrate 10 has a function of increasing the mechanical strength of the information recording medium and protecting the laminate from the first dielectric layer 2 to the reflective layer 8. A material preferable for the laminate substrate 10 is the same as those preferable for the substrate 1.

The information recording medium of the present embodiment is a one-face structure disk having one recording layer, however the information recording medium is not limited thereto and may have two or more recording layers.

Next, a method for manufacturing an information recording medium of the present embodiment will be described.

The information recording medium of the present embodiment is manufactured by successively carrying out a step (step a) of setting a substrate 1 (for example, having a thickness of 0.6 mm) in which a guide groove (groove faces 20 and land faces 21) is formed in a film deposition device and forming a first dielectric layer 2 on the surface of the substrate 1 in which the guide groove is formed; a step (step b) of forming the recording layer 4; a step (step c) of forming a second dielectric layer 6; a step (step d) of forming a light absorption adjusting layer 7; and a step (step e) of forming a reflective layer 8; and further steps of forming an adhesive layer 9 on the surface of the reflective layer 8 and laminating a laminate substrate 10. In this specification, unless otherwise specified, "surface" relevant to the respective layers means the surface (the surface perpendicular to the thickness direction) exposed when the layers are formed.

First, the step a is carried out for forming the first dielectric layer 2 on the face of the substrate 1 in which the guide groove is formed. The step a is carried out by a sputtering method in an Ar gas atmosphere using a high frequency power source. The gas to be introduced in the sputtering may be an Ar gas or a mixed gas atmosphere additionally containing an oxygen gas, a nitrogen gas, a $CH_4$ gas or the like in accordance with the material layer to be formed.

A sputtering target to be used in the step a is a sputtering target containing an oxide of at least one element selected from the group GM consisting of Sn and Ga and an oxide of at least one element selected from the group GL consisting of Ta and Y.

As described above, the sputtering target containing at least one element selected from the group GM, at least one element selected from the group GL and an oxygen atom is more specifically a material defined by the formula 3, that is, $Mh_2O_{i2}L_{j2}$ (atom percent). In this formula, M denotes at least one element selected from the group GM; L denotes at least one element selected from the group GL; and h2, i2, and j2 satisfy the following; $5 \leq h2 \leq 40$, $40 \leq i2 \leq 70$, $0 \leq j2 \leq 35$, and $h2+i2+j2=100$. If such a sputtering target is used, a layer containing the material defined by the formula 1 can be formed.

The sputtering target to be used in the manufacturing method of the present invention contains preferably 30 mol % or more and more preferably 50 to 95 mol % of an oxide group of the elements selected from the group GM relative to the mixture.

For the sputtering target containing the above-specified oxides, a material containing at least one oxide selected from $SnO_2$ and $Ga_2O_3$ and at least one oxide selected from $Ta_2O_5$ and $Y_2O_3$ can be employed. More specifically, the material may be a material defined by the formula 4, that is, $(D)_x(A)_{100-x}$ (mol %). In this formula, a target can be used having a material in which D denotes at least one oxide selected from $SnO_2$ and $Ga_2O_3$; A denotes at least one oxide selected from $Ta_2O_5$ and $Y_2O_3$; and x denotes a mixing ratio of each compounds and satisfies $30 \leq x \leq 95$. Use of such a target makes it possible to form a layer containing the material defined by the formula 2.

The layer containing the above-mentioned material may further contain a third component other than these compounds and particularly contain not more than several % of impurities. Further, a slight amount of composition elements of a layer formed adjacently to the layer may be mixed. Components to be contained as the third component are as exemplified above.

Next, the step b is carried out to form the recording layer 4 on the surface of the first dielectric layer 2. The step b is also carried out by a sputtering method. The sputtering is carried out in an Ar gas atmosphere or in a mixed gas atmosphere of an Ar gas and an $N_2$ gas by using a DC power source. Similarly to the step a, another gas may be introduced in accordance with the object. As the sputtering target, those which contain one material selected from Ge—Sb—Te, Ge—Sn—Sb—Te, Ge—Bi—Te, Ge—Sn—Bi—Te, Ge—Sb—Bi—Te, Ge—Sn—Sb—Bi—Te, Ag—In—Sb—Te, and Sb—Te, is used. The recording layer 4 is in an amorphous state after the film deposition.

Next, the step c is carried out to form a second dielectric layer 6 on the surface of the recording layer 4. The step c is carried out similarly to the step a. The second dielectric layer 6 can be formed by using a sputtering target containing the same compounds as those for the first dielectric layer 2 at a different mixing ratio or a sputtering target containing different oxides. For example, the first dielectric layer 2 may be formed using a mixed material of $SnO_2$—$Ta_2O_5$ and the second dielectric layer 6 may be formed using a mixed material of $SnO_2$—$Ga_2O_3$—$Y_2O_3$. As described above, the first dielectric layer 2 and the second dielectric layer 6 may be formed while the types of oxides to be contained in the layers and/or the mixing ratios of the oxides are optimized in accordance with the desired functions.

Next, the step d is carried out to form a light absorption adjusting layer 7 on the surface of the second dielectric layer 6. In the step d, sputtering is carried out using a DC power source or a high frequency power source. As a sputtering target may be employed those containing a material selected from amorphous Ge alloys such as Ge—Cr and Ge—Mo; amorphous Si alloys such as Si—Cr, Si—Mo, and Si—W; Te compounds; and crystalline metals such as Ti, Zr, Nb, Ta, Cr, Mo, W, SnTe, and PbTe, semi-metals, and semiconductor materials. The sputtering is generally carried out in an Ar gas atmosphere.

Next, the step e is carried out to form a reflective layer 8 on the surface of the light absorption adjusting layer 7. The step e is carried out by sputtering. The sputtering is carried out using a DC power source or a high frequency power source in an Ar gas atmosphere. As a sputtering target, those containing an alloy material such as Al—Cr, Al—Ti, Ag—Pd, Ag—Pd—Cu, Ag—Pd—Ti, Ag—In, or Au—Cr may be employed.

As described above, the steps a to e are all sputtering steps. Accordingly, the steps a to e can be carried out continuously by successively changing the targets in a single sputtering apparatus. Further, the steps a to e can also be carried out using independent sputtering apparatuses.

After the reflective layer 8 is formed, the substrate 1 on which layers from the first dielectric layer 2 to the reflective layer 8 is successively formed is taken out of the sputtering apparatus. Thereafter, a UV-curing resin is applied to the surface of the reflective layer 8 by, for example, a spin coating method. A laminate substrate 10 is closely stuck to the applied UV-curing resin and ultraviolet rays are applied from the laminate substrate 10 side to cure the resin and finish the lamination step.

After the lamination step is completed, according to the need, an initialization step is carried out. The initialization step is a step of crystallizing the recording layer 4 in the amorphous state by increasing the temperature up to the crystallization temperature or higher by, for example, applying semiconductor laser. The initialization step may be carried out before the lamination step. As described above, the information recording medium of the embodiment 1 can be manufactured by sequentially carrying out the steps a to e, the step of forming the adhesive layer, and the step of laminating the laminate substrate 10.

Embodiment 2

Figure 2:
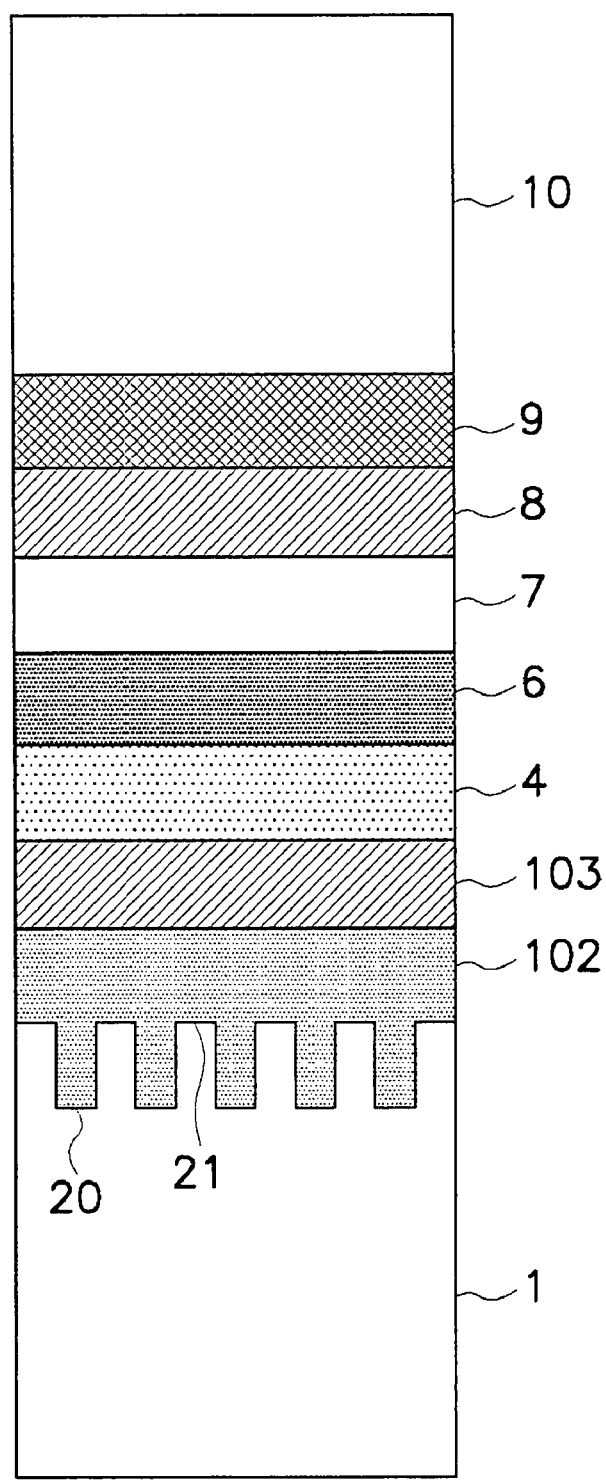
FIG. 2 is a partial cross-section of one example of an information recording medium of an embodiment 2 of the present invention.

As the embodiment 2 of the present invention, a partial cross-section of the information recording medium is shown in FIG. 2.

The information recording medium of the present embodiment shown in FIG. 2 has a configuration formed by successively forming a first dielectric layer 102, a first interface layer 103, a recording layer 4, a second dielectric layer 6, a light absorption adjusting layer 7, and a reflective layer 8 in this order on one surface of a substrate 1 and further adhering a laminate substrate 10 to the reflective layer 8 by an adhesive layer 9. The information recording medium of the present embodiment differs from a conventional information recording medium shown in FIG. 5 in that the information recording medium does not have an interface layer between the recording layer 4 and the second dielectric layer 6. Further, the information recording medium of the present embodiment differs from the information recording medium shown in FIG. 1 in that the first dielectric layer 102 and the first interface layer 103 are laminated between the substrate 1 and the recording layer 4 in this order. In the present embodiment, the second dielectric layer 6 is formed in form of the oxide type material layer same as that of the first and the second dielectric layers in the information recording medium of the embodiment 1. In addition, the reference characters in FIG. 2 the same as those employed in FIG. 1 denote the constituent elements having the same functions and formed by using the materials and the methods described with reference to FIG. 1. Accordingly, the constituent elements already explained for FIG. 1 are not explained in detail here.

In the information recording medium of the present embodiment, the first dielectric layer 102 is formed using a material ($ZnS$—$SiO_2$) used for the dielectric layer composing a conventional information recording medium. Accordingly, the interface layer 103 is formed for preventing mass transfer occurring between the first dielectric layer 102 and the recording layer 104 due to repeated recording. The material and the thickness of the interface layer 103 are preferably a mixed material such as $ZrO_2$—$SiO_2$—$Cr_2O_3$ or Ge—Cr and 1 to 10 nm and more preferably 2 to 7 nm. Accordingly, the optical reflectance and optical absorbance of the laminate from the first dielectric layer 102 to the reflective layer 8 formed on the surface of the substrate 1 can be changed to suppress effects on the recording and erasing performance.

Next, a method for manufacturing the information recording medium of the present embodiment will be described. In the present embodiment, the information recording medium is manufactured by successively carrying out a step (step h) of forming a first dielectric layer 102 on the face of a substrate 1 in which a guide groove is formed; a step (step i) of forming a first interface layer 103; a step (step b) of forming a recording layer 4; a step (step c) of forming a second dielectric layer 6; a step (step d) of forming a light absorption adjusting layer 7; a step (step e) of forming a reflective layer 8; and further a step of forming an adhesive layer 9 on the surface of the reflective layer 8 and a step of laminating a laminate substrate 10. Since the steps b, c, d, and e are same as described in the embodiment 1, detailed explanation thereof will be skipped here. On completion of the step of laminating the laminate substrate 10, as described in relation to the embodiment 1, the initialization step may be carried out, if necessary, to obtain an information recording medium.

As described above, in the embodiments 1 and 2, the information recording medium for recording and reproducing information using laser light is explained using embodiments of the information recording medium within the scope of the present invention with reference to FIG. 1 and FIG. 2. The information recording medium of the present invention is, however, not limited to these exemplified embodiments. The information recording medium of the present invention may have any embodiments as long as the dielectric layer adjacent to the recording layer is formed using an oxide type material layer. That is, the present invention is applicable irrespective of the order of forming the layers on the substrate, the number of recording layers, the recording conditions, the storage capacity, and the like. In addition, the information recording medium of the present invention is suitable for recording information at various wavelengths. Accordingly, the configuration and the method for manufacturing the information recording medium of the present invention may be employed for, for example, a DVD-RAM and a DVD-RW for recording and reproducing by laser light with a wavelength of 630 to 680 nm or large storage capacity optical disks for recording and reproducing by laser light with a wavelength of 400 to 450 nm.

Embodiment 3

Figure 3:
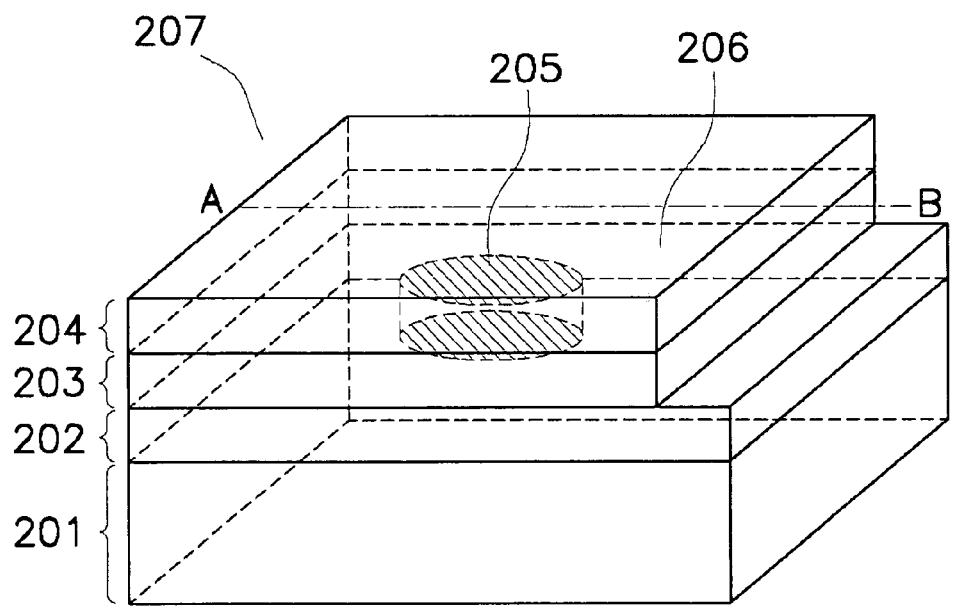
FIG. 3 is a perspective view of one example of an information recording medium of the present invention in which information is recorded by applying electric energy.

As the embodiment 3 of the present invention, a perspective view of one example of an information recording medium is shown in FIG. 3 for recording and reproducing information by applying electric energy.

As shown in FIG. 3, the information recording medium of the present embodiment is a memory formed by a lower part electrode 202, a recording part 203, and an upper part electrode 204 formed on the surface of a substrate 201 in this order. The recording part 203 of the memory has a configuration including a column-like recording layer 205 and a dielectric layer 206 surrounding the recording layer 205. Different from the case of the information recording media described with reference to FIG. 1 and FIG. 2 in the embodiments 1 and 2, in the case of the present memory with this configuration, the recording layer 205 and the dielectric layer 206 are formed on the same plane but do not have a layered relation. However, in the memory, the lower part electrode 202 and the upper part electrode 204 can be called respectively a "layer" since both of the recording layer 205 and the dielectric layer 206 compose a portion of a laminate including the substrate 201. Accordingly, the information recording medium of the present invention includes the configuration in which the recording layer and the dielectric layer are on the same plane.

As the substrate 201 may be employed a semiconductor substrate such as a Si substrate; a substrate made of a polycarbonate resin or an acrylic resin; an insulating substrate such as a $SiO_2$ substrate and an $Al_2O_3$ substrate. The lower part electrode 202 and the upper part electrode 204 are formed using proper conductive materials. The lower part electrode 202 and the upper part electrode 204 can be formed by sputtering metals such as Au, Ag, Pt, Al, Ti, W. and Cr or a mixture thereof.

The recording layer 205 composing the recording part 203 contains a material causing phase change by applying electric energy and can be called as a phase change part in the recording part 203. The recording layer 205 contains a material causing phase change between a crystal phase and an amorphous phase by Joule's heat generated by applying electric energy. The material for the recording layer 205 is, for example, a Ge—Sb—Te, Ge—Sn—Sb—Te, Ge—Bi—Te, Ge—Sn—Bi—Te, Ge—Sb—Bi—Te, or Ge—Sn—Sb—Bi—Te type material and more particularly, for example, a GeTe—$Sb_2Te_3$ type material or a GeTe—$Bi_2Te_3$ type material can be used.

The dielectric layer 206 composing the recording part 203 has a function of preventing the electric current, which flows to the recording layer 205, from escaping to the peripheral parts by applying electric voltage between the upper part electrode 204 and the lower part electrode 202 and accordingly electrically and also thermally insulating the recording layer 205. Therefore, the dielectric layer 206 can also be called as a thermal insulation part. The dielectric layer 206 is formed in form of an oxide type material layer and specifically a layer containing materials defined by the formula 1 and the formula 2. The materials are preferably used for the dielectric layer 206 because (1) these materials have a high melting point, (2) atom diffusion in the material layer is unlikely to be caused even if it is heated, and (3) the thermal conductivity is low The present embodiment will be described in more detail with an operation method in the following examples.

EXAMPLES

The present invention will be described more concretely.

First, the relation between a nominal composition (that is, the composition publicly shown by a target manufacturer at the time of commercialization) and an analyzed composition for targets having oxide type material layers and employed for forming a dielectric layer of an information recording medium of the present invention was previously tested and confirmed.

In this experiment, as one example, a sputtering target whose nominal composition is shown by $(SnO_2)_{40}(Ga_2O_3)_{40}(Y_2O_3)_{20}$ (mol %) corresponding to the formula 4 was used. The sputtering target was powdered and composition analysis of the powder was carried out by an x-ray micro-analyzer. As a result, the analyzed composition of the sputtering target was found to be the following composition formula expressed on the basis of the ratios (atom percent) of the respective elements. The results of analysis are shown in Table 2. Table 2 also shows a converted composition, which is the element composition calculated from the nominal composition.

TABLE 2

| Nominal composition (mol %) $(SnO_2)_{40}(Ga_2O_3)_{40}(Y_2O_3)_{20}$ Converted composition (atom percent) $Sn_{9.5}Ga_{19.1}O_{61.9}Y_{9.5}$ | Composition analysis of material layer Analyzed composition (atom percent) $Sn_{8.6}Ga_{20.1}O_{62.3}Y_{9.0}$ |
|---|---|

As shown in Table 2, the analyzed composition was approximately the same as the converted composition. From this result, it was confirmed that the actual compositions (that is, the analyzed compositions) of sputtering targets defined by the formulas 3 and 4 were approximately the same as the element compositions obtained by calculation (that is, converted compositions) and accordingly the nominal compositions were proper. Therefore, in the following examples, the composition of a sputtering target is expressed on the basis of a nominal composition (mol %). Further, it is also supposed to be correct that the nominal composition of a sputtering target and the composition (mol %) of an oxide type material layer formed by a sputtering method using the sputtering target are same. Consequently, in examples described below, the shown composition of a sputtering target is employed as the composition of a layer formed using the sputtering target.

Example 1

In an information recording medium described in the embodiment 1 and shown in FIG. 1, a first dielectric layer 2 and a second dielectric layer 6 were formed using a sputtering target having a nominal composition of $(SnO_2)_{95}(Y_2O_3)_5$ (mol %). The first dielectric layer 2 and the second dielectric layer 6 were formed from the same material. Hereinafter, a method for manufacturing the information recording medium of the present example will be described. In the following description, the reference characters the same as those assigned to the respective constituent elements shown in FIG. 1 are employed.

First, as a substrate 1 was used a polycarbonate substrate in which a guide groove with a depth of 56 nm and track pitches (the distance between centers of the groove surfaces and the land surfaces in the planes parallel to the main face of the substrate 1) of 0.615 μm was previously formed in one surface and which was a disk with a diameter of 120 mm and a thickness of 0.6 mm.

A first dielectric layer 2 with a thickness of 145 nm, a recording layer 4 with a thickness of 8 nm, a second dielectric layer 6 with a thickness of 45 nm, a light absorption adjusting layer 7 with a thickness of 40 nm, and a reflective layer 8 with a thickness of 80 nm were formed on the substrate 1 in this order by a sputtering method in the following manner.

As a material constituting the first dielectric layer 2 and the second dielectric layer 6 was used $(SnO_2)_{95}(Y_2O_3)_5$ (mol %).

In the step of forming the first dielectric layer 2 and the second dielectric layer 6, a sputtering target made of the above-mentioned material (diameter 100 mm, thickness 6 mm) was disposed in a film deposition device and high frequency sputtering was carried out at a pressure of 0.13 Pa to carry out film deposition.

The step of forming the recording layer 4 was carried out by disposing a sputtering target (diameter 100 mm, thickness 6 mm) made of a Ge—Sn—Sb—Te type material obtained by partially replacing Ge of a GeTe—$Sb_2Te_3$ quasi-binary composition with Sn in the film deposition device and carrying out DC sputtering at 0.13 Pa. The composition of the recording layer was $Ge_{27}Sn_8Sb_{12}Te_{53}$ (atom percent).

The step of forming the light absorption adjusting layer 7 was carried out by disposing a sputtering target (diameter 100 mm, thickness 6 mm) made of a material having a composition of $Ge_{80}Cr_{20}$ (atom percent) in the film deposition device and carrying out DC sputtering at about 0.4 Pa.

The step of forming the reflective layer 8 was carried out by disposing a sputtering target (diameter 100 mm, thickness 6 mm) made of an Ag—Pd—Cu alloy in the film deposition device and carrying out DC sputtering at about 0.4 Pa.

After forming the reflective layer 8, a UV-curing resin was applied to the reflective layer 8. A laminate substrate 10 made of polycarbonate and having a diameter of 120 mm and a thickness of 0.6 mm was closely stuck to the applied UV-curing resin. Next, ultraviolet rays were applied from the laminate substrate 10 side to cure the resin and laminate the substrate.

After the lamination, an initialization step was carried out using semiconductor laser with a wavelength of 810 nm to crystallize the recording layer 4. On completion of the initialization step, the production of the information recording medium was completed.

Example 2

An information recording medium was produced in the same manner as in Example 1, except that the first dielectric layer 2 and the second dielectric layer 6 were formed using a sputtering target having a nominal composition shown by $(SnO_2)_{90}(Ta_2O_5)_{10}$ (mol %).

Example 3

An information recording medium was produced in the same manner as in Example 1, except that the first dielectric layer 2 and the second dielectric layer 6 were formed using a sputtering target having a nominal composition shown by $(SnO_2)_{80}(Y_2O_3)_{20}$ (mol %).

Example 4

An information recording medium was produced in the same manner as in Example 1, except that the first dielectric layer 2 and the second dielectric layer 6 were formed using a sputtering target having a nominal composition shown by $(SnO_2)_{60}(Y_2O_3)_{10}(Ta_2O_5)_{30}$ (mol %).

Example 5

An information recording medium was produced in the same manner as in Example 1, except that the first dielectric layer 2 and the second dielectric layer 6 were formed using a sputtering target having a nominal composition shown by $(SnO_2)_{50}(Y_2O_3)_{50}$ (mol %).

Example 6

An information recording medium was produced in the same manner as in Example 1, except that the first dielectric layer 2 and the second dielectric layer 6 were formed using a sputtering target having a nominal composition shown by $(SnO_2)_{40}(Ga_2O_3)_{40}(Y_2O_3)_{20}$ (mol %).

Example 7

An information recording medium was produced in the same manner as in Example 1, except that the first dielectric layer 2 and the second dielectric layer 6 were formed using a sputtering target having a nominal composition shown by $(SnO_2)_{60}(Ga_2O_3)_{20}(Y_2O_3)_{20}$ (mol %).

Example 8

An information recording medium was produced in the same manner as in Example 1, except that the first dielectric layer 2 and the second dielectric layer 6 were formed using a sputtering target having a nominal composition shown by $(SnO_2)_{40}(Ga_2O_3)_{40}(Ta_2O_5)_{20}$ (mol %).

Example 9

An information recording medium was produced in the same manner as in Example 1, except that the first dielectric layer 2 and the second dielectric layer 6 were formed using a sputtering target having a nominal composition shown by $(Ga_2O_3)_{70}(Ta_2O_5)_{15}(Y_2O_3)_{15}$ (mol %).

Example 10

An information recording medium was produced in the same manner as in Example 1, except that the first dielectric layer 2 and the second dielectric layer 6 were formed using a sputtering target having a nominal composition shown by $(SnO_2)_{40}(Ta_2O_5)_{30}(Y_2O_3)_{30}$ (mol %).

Example 11

An information recording medium was produced in the same manner as in Example 1, except that the first dielectric layer 2 and the second dielectric layer 6 were formed using a sputtering target having a nominal composition shown by $(SnO_2)_{30}(Ta_2O_5)_{35}(Y_2O_3)_{35}$ (mol %).

Comparative Example 1

As an information recording medium of Comparative Example 1, an information recording medium having the configuration shown in FIG. 5 was produced. Here, a first dielectric layer 102 and a second dielectric layer 106 were formed using a sputtering target of $ZnS$—$SiO_2$. A first interface layer 103 and a second interface layer 105 were made to be a layer with a thickness of 5 nm and made of $ZrO_2$—$SiO_2$—$Cr_2O_3$, respectively.

The first dielectric layer 102 and the second dielectric layer 106 were formed using a sputtering target (diameter 100 mm, thickness 6 mm) made of $(ZnS)_{80}(SiO_2)_{20}$ (mol %) by high frequency sputtering at a pressure of 0.13 Pa.

The first interface layer 103 and the second interface layer 105 were formed by disposing a sputtering target (diameter 100 mm, thickness 6 mm) made of a material having a composition of $(ZrO_2)_{25}(SiO_2)_{25}(CrO_2)_{50}$ (mol %) in a film deposition device and carrying out high frequency sputtering. Formation of the light absorption adjusting layer 7 and the reflective layer 8 and lamination of the laminate substrate 10 were carried out in the same manner as in the case of the information recording medium of Example 1.

Comparative Example 2

An information recording medium was produced in the same manner as in Example 1, except that the first dielectric layer 2 and the second dielectric layer 6 were formed using a sputtering target having a nominal composition containing solely $SnO_2$.

Comparative Example 3

An information recording medium was produced in the same manner as in Example 1, except that the first dielectric layer 2 and the second dielectric layer 6 were formed using a sputtering target having a nominal composition containing solely $Ga_2O_3$.

Comparative Example 4

An information recording medium was produced in the same manner as in Example 1, except that the first dielectric layer 2 and the second dielectric layer 6 were formed using a sputtering target having a nominal composition containing solely $Y_2O_3$.

Comparative Example 5

An information recording medium was produced in the same manner as in Example 1, except that the first dielectric layer 2 and the second dielectric layer 6 were formed using a sputtering target having a nominal composition shown by $(SnO_2)_{50}(Ga_2O_3)_{50}$ (mol %).

Next, the information recording media of the above-mentioned Examples 1 to 13 and Comparative Examples 1 to 5 were evaluated. Hereinafter, evaluation methods will be described. The evaluations were carried out in the following three evaluation items: (1) adhesiveness between a dielectric layer and a recording layer; (2) recording sensitivity; and (3) rewriting performance.

First, the adhesiveness (1) was evaluated on the basis of occurrence of peeling under a high temperature and high humidity condition. Specifically, after each information recording medium after the initialization step was left in a high temperature and high humidity bath at a temperature of 90° C. and 80RH % for 100 hours, whether peeling occurred or not in at least one interface between the recording layer 4 and the dielectric layers 2 and 6 in contact with the recording layer was observed by eye observation using an optical microscope.

The recording sensitivity (2) and the repeated rewriting performance (3) were evaluated on the basis of the optimum power and the repeat count with the recording power using a recording and reproducing evaluation apparatus.

The signal evaluation of each information recording medium was carried out using an information recording system with a general configuration including a spindle motor for rotating the information recording medium, an optical head provided with semiconductor laser for emitting laser light, and an objective lens for focusing the leaser light upon the recording layer 4 of the information recording medium. Specifically, semiconductor laser with a wavelength of 660 nm and an objective lens having a numerical aperture of 0.6 were used to carry out recording equivalent to a capacity of 4.7 GB. At this time, the linear velocity for rotating the information recording medium was adjusted to be 8.2 m/s. Further, a time interval analyzer was employed for measuring a jitter value at the time of calculating an average jitter value to be described later.

To determine the recording and reproducing condition at the time of measuring the repeat count, the peak power (Pp) and the bias power (Pb) were set in the following manner. Using the above-mentioned system, the laser beam was applied toward the information recording medium while the power was modulated between the peak power (mW) at a high power level and the bias power (mW) at a low power level to record random signals with a mark length of 0.42 μm (3T) to 1.96 μm (14 T) ten times on a single groove surface of the recording layer 4. Successively, the jitter value in the front end (the jitter at the recording mark front end part) and the jitter value in the rear end (the jitter at the recording mark rear end part) were measured and an average jitter value was calculated as the average value of these jitter values. The average jitter value was measured in respective recording conditions in which bias power was fixed at a constant value and the peak power was variously changed. When the average jitter value of random signals reached 13% by gradually increasing the peak power, the power 1.3 times as high as the peak powder was temporarily determined to be Pp1. Next, the average jitter value was measured in respective recording conditions in which peak power was fixed at Pp1 and bias power was variously changed. When the average jitter value of random signals reached 13% or lower, the average value of the upper limit value and the lower limit value of the bias power was set to be Pb. The average jitter value was measured in respective recording conditions in which the bias power was fixed at Pb and the peak power was variously changed. When the average jitter value of random signals reached 13% by gradually increasing the peak power, the power 1.3 times as high as the peak powder was determined to be Pp. When recording was carried out in the condition of Pp and Pb set in the above-mentioned manner, an average jitter value of 8 to 9% was obtained in 10 times repeated recording. In consideration of the laser power upper limit of the system, it is desirable to satisfy Pp≦14 mW and Pb≦8 mW.

The repeat count was determined based on the average jitter value in this Example. The average jitter value was measured after random signals with a mark length of 0.42 μm (3T) to 1.96 μm (14T) were continuously recorded by applying laser light toward the information recording medium while modulating the power based on Pp and Pb set in the above-mentioned manner and repeating the laser irradiation prescribed times on a single groove surface (by groove recording). The average jitter value was measured and evaluated at repeat counts of 1, 2, 3, 5, 10, 100, 200, 500 and every 1000 times to 10000 times after 1000 times. The repeated rewriting performance was evaluated by the repeat count when the average jitter value reached 13%. As the repeat count is higher, the repeated rewriting performance is better. When the above-mentioned information recording media are used for an image-sound recorder, for example, the repeat count is preferably at least 1000 times and more preferably at least 10000 times.

TABLE 3

| | | Nominal composition (mol %) | Converted composition (atom percent) | Separation | Pp (mW) | Rewriting performance |
|---|---|---|---|---|---|---|
| Example | 1 | $(SnO_2)_{95}(Y_2O_3)_5$ | $Sn_{30.6}O_{66.1}Y_{3.2}$ | None | 13.3 | good |
| | 2 | $(SnO_2)_{90}(Ta_2O_5)_{10}$ | $Sn_{26.5}O_{67.6}Ta_{5.9}$ | None | 13.4 | good |
| | 3 | $(SnO_2)_{80}(Y_2O_3)_{20}$ | $Sn_{23.5}O_{64.7}Y_{11.8}$ | None | 13.1 | good |
| | 4 | $(SnO_2)_{90}(Y_2O_3)_{10}(Ta_2O_5)_{30}$ | $Sn_{11.1}O_{55.6}Y_{5.6}Ta_{27.8}$ | None | 12.8 | good |
| | 5 | $(SnO_2)_{50}(Y_2O_3)_{50}$ | $Sn_{12.5}O_{62.5}Y_{25.0}$ | None | 12.7 | good |
| | 6 | $(SnO_2)_{40}(Ga_2O_3)_{40}(Y_2O_3)_{20}$ | $Sn_{9.5}Ga_{19.0}O_{61.9}Y_{9.5}$ | None | 13.4 | good |
| | 7 | $(SnO_2)_{60}(Ga_2O_3)_{20}(Y_2O_3)_{20}$ | $Sn_{16.7}Ga_{11.1}O_{66.7}Y_{5.6}$ | None | 12.8 | good |
| | 8 | $(SnO_2)_{40}(Ga_2O_3)_{40}(Ta_2O_5)_{20}$ | $Sn_{8.7}Ga_{17.4}O_{65.2}Ta_{8.7}$ | None | 13.3 | good |
| | 9 | $(Ga_2O_3)_{70}(Ta_2O_5)_{15}(Y_2O_3)_{15}$ | $Ga_{26.4}O_{62.3}Ta_{5.7}Y_{5.7}$ | None | 13.5 | good |
| | 10 | $(SnO_2)_{40}(Ta_2O_5)_{30}(Y_2O_3)_{30}$ | $Sn_{8.3}O_{66.7}Ta_{12.5}Y_{12.5}$ | None | 13.2 | good |
| | 11 | $(SnO_2)_{30}(Ta_2O_5)_{35}(Y_2O_3)_{35}$ | $Sn_{5.9}O_{66.7}Ta_{13.7}Y_{13.7}$ | None | 13.5 | good |
| Comparative Example | 1 | Conventional example, 7 layers | — | None | 12.0 | good |
| | 2 | $SnO_2$ | $Sn_{33.3}O_{66.7}$ | None | 14.5 | insufficient |
| | 3 | $Ga_2O_3$ | $Ga_{40}O_{60}$ | None | 14.9 | good |
| | 4 | $Y_2O_3$ | $Y_{40}O_{60}$ | None | 14.9 | good |
| | 5 | $(SnO_2)_{50}(Ga_2O_3)_{50}$ | $Sn_{12.5}Ga_{25}O_{62.5}$ | None | 14.3 | insufficient |

Table 3 shows the evaluation results of (1) adhesiveness; (2) recording sensitivity; and (3) rewriting performance for information recording media of Examples 1 to 11 and Comparative Examples 1 to 5. With respect to the information recording media of Examples 1 to 11 and Comparative Examples 2 to 5, the compositions (atom percent) of materials employed for the dielectric layers are also shown. Herein, occurrence of separation after the above-mentioned high temperature and high humidity test is shown as the evaluation results of the adhesiveness. The recording sensitivity shows the set peak power and is evaluated to be good if it is 14 mW or lower. Further, the rewriting performance is evaluated as following: "bad" shows less than 1000 repeat counts; "insufficient" shows not less than 1000 and less than 10000 repeat counts; and "good" shows not less than 10000 repeat counts.

As being made clear from Table 3, when the materials for the dielectric layers 2 and 6 were $SnO_2$, $Ga_2O_3$, $Y_2O_3$, $(SnO_2)_{50}(Ga_2O_3)_{50}$ (mol %), the adhesiveness between the recording layer 4 and the dielectric layers 2 and 6 was good, however the recording sensitivity was insufficient (Comparative Examples 2 to 5). On the other hand, as to Examples 1 to 11, the oxide group consisting of $SnO_2$ and $Ga_2O_3$ and the oxide group consisting of $Ta_2O_5$ and $Y_2O_3$ were mixed within the range defined in the present invention, so that good recording sensitivity and rewriting performance were obtained.

It was confirmed that in consideration of the balance between the recording sensitivity and the rewriting performance, the ratio of the oxide group consisting of $SnO_2$ and $Ga_2O_3$ was preferably 30 mol % or higher and in consideration of the recording sensitivity, the ratio of the oxide group consisting of $Ta_2O_5$ and $Y_2O_3$ was preferably 5 mol % or higher.

Next, Examples of information recording media with the configuration shown in the embodiment 2 will be described.

Example 12

An information recording medium of the present Example was the information recording medium shown in FIG. 2 described in the embodiment 2 and the first dielectric layer 102 was formed using $(ZnS)_{80}(SiO_2)_{20}$ (mol %) and the first interface layer 103 was formed in a thickness of 2 to 5 nm using $ZrO_2$—$SiO_2$—$Cr_2O_3$. The information recording medium was produced in the same manner as in Example 1, except for the above-mentioned configuration. In Example 12, the second dielectric layer 6 disposed on and in contact with the recording layer 4 was formed using the sputtering target made of a material employed in Example 1.

Example 13

An information recording medium was produced in the same manner as in Example 12, except that the second dielectric layer 6 was formed using the sputtering target made of a material employed in Example 2.

Example 14

An information recording medium was produced in the same manner as in Example 12, except that the second dielectric layer 6 was formed using the sputtering target made of a material employed in Example 5.

Example 15

An information recording medium was produced in the same manner as in Example 12, except that the second dielectric layer 6 was formed using the sputtering target made of a material employed in Example 6.

Example 16

An information recording medium was produced in the same manner as in Example 12, except that the second dielectric layer 6 was formed using the sputtering target made of a material employed in Example 7.

Example 17

An information recording medium was produced in the same manner as in Example 12, except that the second dielectric layer 6 was formed using the sputtering target made of a material employed in Example 8.

Example 18

An information recording medium was produced in the same manner as in Example 12, except that the second dielectric layer 6 was formed using the sputtering target made of a material employed in Example 9.

Example 19

An information recording medium was produced in the same manner as in Example 12, except that the second dielectric layer 6 was formed using the sputtering target made of a material employed in Example 10.

Example 20

An information recording medium was produced in the same manner as in Example 12, except that the second dielectric layer 6 was formed using the sputtering target made of a material employed in Example 11.

Comparative Example 6

An information recording medium was produced in the same manner as in Example 12, except that the second dielectric layer 6 was formed using the sputtering target made of a material employed in Comparative Example 2.

Comparative Example 7

An information recording medium was produced in the same manner as in Example 12, except that the second dielectric layer 6 was formed using the sputtering target made of a material employed in Comparative Example 3.

Comparative Example 8

An information recording medium was produced in the same manner as in Example 12, except that the second dielectric layer 6 was formed using the sputtering target made of a material employed in Comparative Example 4.

Comparative Example 9

An information recording medium was produced in the same manner as in Example 12, except that the second dielectric layer 6 was formed using the sputtering target made of a material employed in Comparative Example 5.

TABLE 4

|  |  | Nominal composition (mol %) | Converted composition (atom percent) | Separation | Pp (mW) | Rewriting performance |
|---|---|---|---|---|---|---|
| Example | 12 | $(SnO_2)_{95}(Y_2O_3)_5$ | $Sn_{30.6}O_{66.1}Y_{3.2}$ | None | 13.1 | good |
|  | 13 | $(SnO_2)_{90}(Ta_2O_5)_{10}$ | $Sn_{26.5}O_{67.6}Ta_{5.9}$ | None | 13.2 | good |
|  | 14 | $(SnO_2)_{50}(Y_2O_3)_{50}$ | $Sn_{12.5}O_{62.5}Y_{25.0}$ | None | 12.5 | good |
|  | 15 | $(SnO_2)_{40}(Ga_2O_3)_{40}(Y_2O_3)_{20}$ | $Sn_{9.5}Ga_{19.0}O_{61.9}Y_{9.5}$ | None | 13.1 | good |

TABLE 4-continued

|  |  | Nominal composition (mol %) | Converted composition (atom percent) | Separation | Pp (mW) | Rewriting performance |
|---|---|---|---|---|---|---|
|  | 16 | $(SnO_2)_{60}(Ga_2O_3)_{20}(Y_2O_3)_{20}$ | $Sn_{16.7}Ga_{11.1}O_{66.7}Y_{5.6}$ | None | 12.6 | good |
|  | 17 | $(SnO_2)_{40}(Ga_2O_3)_{40}(Ta_2O_5)_{20}$ | $Sn_{8.7}Ga_{17.4}O_{65.2}Ta_{8.7}$ | None | 13.1 | good |
|  | 18 | $(Ga_2O_3)_{70}(Ta_2O_5)_{15}(Y_2O_3)_{15}$ | $Ga_{26.4}O_{62.8}Ta_{5.7}Y_{5.7}$ | None | 13.3 | good |
|  | 19 | $(SnO_2)_{40}(Ta_2O_5)_{30}(Y_2O_3)_{30}$ | $Sn_{8.3}O_{66.7}Ta_{12.5}Y_{12.5}$ | None | 13.3 | good |
|  | 20 | $(SnO_2)_{30}(Ta_2O_5)_{35}(Y_2O_3)_{35}$ | $Sn_{5.9}O_{66.7}Ta_{13.7}Y_{13.7}$ | None | 13.6 | good |
| Comparative Example | 6 | $SnO_2$ | $Sn_{33.3}O_{66.7}$ | None | 14.2 | insufficient |
|  | 7 | $Ga_2O_3$ | $Ga_{40}O_{60}$ | None | 14.9 | good |
|  | 8 | $Y_2O_3$ | $Y_{40}O_{60}$ | None | 14.9 | good |
|  | 9 | $(SnO_2)_{50}(Ga_2O_3)_{50}$ | $Sn_{12.5}Ga_{25}O_{52.5}$ | None | 14.2 | insufficient |

Table 4 shows the evaluation results of (1) adhesiveness; (2) recording sensitivity; and (3) rewriting performance for information recording media of Examples 12 to 20 and Comparative Examples 6 to 9. The standards of the evaluations are as described in Table 3.

As being made clear from Table 4, almost the same tendency as that in Table 3 was found when the first dielectric layer 102 and the interface layer 103 were formed between the substrate 1 and the recording layer 4 and the materials within the scope of the present invention were employed only for the second dielectric layer 6. That is, when $SnO_2$, $Ga_2O_3$, or their mixture and $Y_2O_3$ alone was used, the adhesiveness between the recording layer 4 and the dielectric layers 102 and 6 was good, however it was insufficient to satisfy both of the recording sensitivity and the rewriting performance (Comparative Examples 6 to 9). On the other hand, as to Examples 12 to 20, the oxide group consisting of $SnO_2$ and $Ga_2O_3$ and at least one oxide from the oxide group consisting of $Ta_2O_5$ and $Y_2O_3$ were mixed within the range defined in the present invention, so that good recording sensitivity was obtained.

It was confirmed that in consideration of the balance between the adhesiveness and the recording sensitivity, the ratio of the oxide group consisting of $SnO_2$ and $Ga_2O_3$ was preferably 30 mol % or higher and in consideration of the recording sensitivity, the ratio of the oxide group consisting of $Ta_2O_5$ and $Y_2O_3$ was preferably 5 mol % or higher.

Just like the information recording media of Examples 1 to 20, when the above-mentioned oxide type material layer was used as a dielectric layer to be formed in contact with the recording layer, the object of decreasing the number of the layers could be accomplished and at the same time, good rewriting performance could be obtained. Additionally, the present invention should not be limited to these examples. The information recording medium is within the scope of the present invention if at least one layer among layers formed in contact with the recording layer is made to be the above-mentioned oxide type material layer.

Example 21

In the above-mentioned Examples 1 to 20, the information recording media for recording information by an optical means were produced. In Example 21, an information recording medium for recording information by an electric means as shown in FIG. 3 was produced. It is so-called memory.

The information recording medium of the present example was produced as follows. First, a surface-nitrided Si substrate 201 having a length of 5 mm, a width of 5 mm, and a thickness of 1 mm was prepared. A lower part electrode 202 of Au with a thickness of 0.1 μm was formed in a region of 1.0 mm×1.0 mm on the substrate 201. A recording layer 205 (hereinafter referred to as a phase-change part 205) functioning as a phase-change part was formed in a thickness of 0.1 μm using a material of $Ge_{38}Sb_{10}Te_{52}$ (expressed as $GesSb_2Te_{11}$ as a compound) on a circular region with a diameter of 0.2 mm on the lower part electrode 202 and a dielectric layer 206 (hereinafter, referred to as a thermal insulation part 206) functioning as a thermal insulation part was formed in the same thickness as that of the phase-change part 205 on a region of 0.6 mm×0.6 mm (excluding the phase-change part 205) using a material of $(SnO)_{40}(Ga_2O_3)_{40}(Y_2O_3)_{20}$ (mol %). Further, an upper part electrode 204 of Au was formed in a thickness of 0.1 μm on a region of 0.6 mm×0.6 mm. The lower part electrode 202, the phase-change part 205, the thermal insulation part 206, and the upper part electrode 204 were all formed by a sputtering method.

In the step of forming the phase-change part 205, a sputtering target made of a Ge—Sb—Te type material (diameter 100 mm, thickness 6 mm) was installed in a film deposition apparatus and DC sputtering was carried out at 100 W power by introducing an Ar gas. The pressure at the time of sputtering was adjusted to be about 0.13 Pa. In the step of forming the thermal insulation part 206, a sputtering target (diameter 100 mm, thickness 6 mm) made of a material having a composition of $(SnO)_{40}(Ga_2O_3)_{40}(Y_2O_3)_{20}$ (mol %) was installed in a film deposition apparatus and high frequency sputtering was carried out under a pressure of about 0.13 Pa. The power was adjusted to be 400 W. During the sputtering, an Ar gas was introduced. The sputtering in these steps was carried out while the regions other than the face where the film deposition was to be carried out were covered with a mask tool so as not to laminate the phase-change part 205 with the thermal insulation part 206. The formation order of the phase-change part 205 and the thermal insulation part 206 is arbitrary and either part can be formed first. A recording part 203 was composed of the phase-change part 205 and the thermal insulation part 206. The phase-change part 205 is equivalent to the recording layer in the present invention and the thermal insulation part 206 is equivalent to the material layer in the present invention.

Since the lower part electrode 202 and the upper part electrode 204 can be formed by a sputtering method employed generally in the field of electrode formation technique, their film deposition steps are not described in detail.

Figure 4:
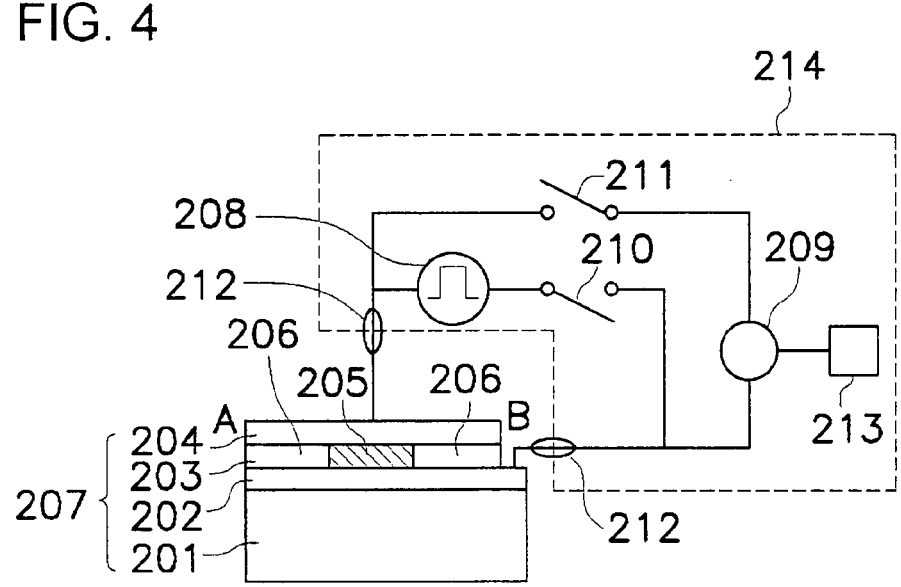
FIG. 4 is a schematic view showing one example of a system using the information recording medium shown in FIG. 3.

It was confirmed that phase change was caused in the phase-change part 205 by applying electric energy to the information recording medium produced in the above-mentioned manner by a system shown in FIG. 4. The cross-section of the information recording medium shown in FIG. 4 is a cross-section formed by cutting the information recording medium as shown in FIG. 3 in the thickness direction along the line I-I.

More specifically, as shown in FIG. 4, two applied parts 212 were bonded to the lower part electrode 202 and the upper part electrode 204 through Au lead wires, so that an electric writing/reading apparatus 214 was connected to the information recording medium (memory) through the applied parts 212. In the electric writing/reading apparatus 214, a pulse generation part 208 was connected via a switch 210 to between the applied parts 212 respectively connected to the lower part electrode 202 and the upper part electrode 204, and a resistance measurement apparatus 209 was connected to between the applied parts 212 via a switch 211. The resistance measurement apparatus 209 was connected to a determination part 213 for determining the height of the resistance value measured by the resistance measurement apparatus 209. Current pulses were applied between the upper part electrode 204 and the lower part electrode 202 via the applied parts 212 by the pulse generation part 208. The resistance value between the lower part electrode 202 and the upper part electrode 204 was measured by the resistance measurement apparatus 209, and the value of the resistance value was judged by the determination part 213. Generally, since the resistance value is changed due to the phase change of the phase-change part 205, the phase state of the phase-change part 205 can be known based on the judgment results.

In the case of Example 21, the melting point, the crystallization temperature, and the crystallization time of the phase-change part 205 were 630° C., 170° C. and 130 ns, respectively. The resistance value between the lower part electrode 202 and the upper part electrode 204 was 1000Ω when the phase-change part 205 was in an amorphous phase state and 20Ω in a crystal phase state. When the phase-change part 205 was in an amorphous phase state (that is, high resistance state), if current pulses of 20 mA and 150 ns were applied between the lower part electrode 202 and the upper part electrode 204, the resistance value between the lower part electrode 202 and the upper part electrode 204 was lowered, so that the phase-change part 205 was changed to be in a crystal phase state from an amorphous phase state. Next, when the phase-change part 205 was in a crystal phase state (that is, low resistance state), if current pulses of 200 mA and 100 ns were applied between the lower part electrode 202 and the upper part electrode 204, the resistance value between the lower part electrode 202 and the upper part electrode 204 was increased, so that the phase-change part 205 was changed to be in an amorphous phase state from a crystal phase state.

From the results described above, it was confirmed that when a layer containing a material having a composition of $(SnO)_{40}(Ga_2O_3)_{40}(Y_2O_3)_{20}$ (mol %) was formed as the thermal insulation part 206 in the surrounding of the phase-change part 205, it is possible to cause phase change of the phase-change part 205 by electric energy application and to provide the phase-change part 205 with a function of recording information. It is supposed to be possible, based on this phenomenon, to cause similar effects also in the oxide type material layers used in Examples 1 to 20 in consideration of the recording sensitivity of Examples 1 to 20.

Just like the case of Example 21, when the thermal insulation part 206 of a dielectric having a composition of $(SnO)_{40}(Ga_2O_3)_{40}(Y_2O_3)_{20}$ (mol %) is formed in the surrounding of the column-like phase-change part 205, the electric current flowing in the phase-change part 205 by voltage application between the upper part electrode 204 and the lower part electrode 202 can be efficiently suppressed from escaping to the peripheral parts. As a result, the temperature of the phase-change part 205 can be efficiently increased by the Joule's heat generated by the current. Particularly, when the phase-change part 205 is to be converted into an amorphous phase state, it is required to once melt the $Ge_{38}Sb_{10}Te_{52}$ of the phase-change part 205 and quickly cool the part. The melting of the phase-change part 205 can be caused at a lower current by forming the thermal insulation part 206 in the surrounding of the phase-change part 205.

The material $(SnO)_4O(Ga_2O_3)_{40}(Y_2O_3)_{20}$ (mol %) employed for the thermal insulation part 206 has a high melting point and it is unlikely to cause atom diffusion by heat, so that the material can be employed for the above-mentioned electric memory. If the thermal insulation part 206 exists in the surrounding of the phase-change part 205, the thermal insulation part 206 becomes a barrier, and the phase-change part 205 is substantially isolated electrically and thermally in the plane of the recording part 203. Based on that, it is made possible to increase the memory capacity of the information recording medium and improve the accessing function and switching function by forming a plurality of phase-change parts 205 isolated from one another by the thermal insulation part 206 on the information recording medium. Alternatively, it is also made possible to connect a plurality of information recording media.

As is described regarding the information recording media of the present invention with reference to various examples, a configuration which was not materialized so far can be formed and both of an information recording medium for recording by an optical means and an information recording medium for recording by an electric means are provided with more excellent properties than those of a conventional information recording medium by employing an oxide type material layer within a scope of the present invention for a dielectric layer so as to be in contact with a recording layer.

An information recording medium and a method for manufacturing the same of the present invention can be usable, as a high density information recording medium, for recording media for a DVD-RAM, a DVD+/−RW, or a BD (Blue-ray Disk); write-once type information recording media such as a BD-R; magnetooptical recording media; and memories using electric energy and optical energy.

The invention claimed is:

1. An information recording medium for recording and/or reproducing information by applying light or electric energy, comprising:
a material layer containing a material which includes Sn and Ga, and at least one element selected from a group GL consisting of Ta and Y, and oxygen, wherein
the material is defined by the following formula:
$M_{h1}O_{i1}L_{j1}$,
wherein in the formula M denotes Sn and Ga, L denotes the at least one element selected from the group GL, and h1, i1, and j1 are expressed on the basis of at % and satisfy the following: $5 \leq h1 \leq 40$, $40 \leq i1 \leq 70$, $0 < j1 \leq 35$, and $h1+i1+j1=100$.

2. The information recording medium according to claim 1, wherein L in the formula denotes Y.

3. The information recording medium according to claim 1, wherein the material layer contains oxides of Sn and Ga and an oxide of the at least one element selected from the group GL.

4. The information recording medium according to claim 3, wherein the material layer contains a material defined by the following formula:

$D_x A_{100-x}$, wherein D denotes $SnO_2$ and $Ga_2O_3$, A denotes at least one oxide selected from $Ta_2O_5$ and $Y_2O_3$, and x is expressed on the basis of mol % and satisfies $30 \leq x \leq 95$.

5. The information recording medium according to claim 1, further comprising a phase-change type recording layer.

6. The information recording medium according to claim 5, wherein the material layer is in contact with at least one face of the recording layer.

7. The information recording medium according to claim 5, wherein the recording layer contains at least one material selected from Ge—Sb—Te, Ge—Sn—Sb—Te, Ge—Bi—Te, Ge—Sn—Bi—Te, Ge—Sb—Bi—Te, Ge—In—Bi—Te, Ag—In—Sb—Te, and Sb—Te.

8. The information recording medium according to claim 5, wherein the recording layer has a thickness of 15 nm or thinner.

9. A method for manufacturing an information recording medium that records and/or reproduces information by applying light or electric energy, the method comprising
forming a material layer containing Sn and Ga, at least one element selected from the group GL consisting of Ta and Y, and oxygen by a sputtering using a sputtering target containing Sn and Ga, at least one element selected from the group GL consisting of Ta and Y, and oxygen,
wherein the sputtering target contains a material defined by the following formula:

$$M_{h2}O_{i2}L_{j2}$$

wherein M denotes Sn and Ga, L denotes at least one element selected from the group GL, and h2, i2, and j2 are expressed on the basis of at % and satisfy the following: $5 \leq h2 \leq 40$, $40 \leq i2 \leq 70$, $0 < j2 \leq 35$, and $h2+i2+j2=100$.

10. The method for manufacturing the information recording medium according to claim 9, wherein L of the sputtering target contains Y.

11. The method for manufacturing the information recording medium according to claim 9, wherein the sputtering target contains oxides of Sn and Ga and an oxide of at least one element selected from the group GL.

12. The method for manufacturing the information recording medium according to claim 11, wherein a combined concentration of oxides of Sn and Ga is 30 mol % or more in the sputtering target.

13. The method for manufacturing the information recording medium according to claim 9, wherein the sputtering target contains a material defined by the following formula:

$$(D)_x(A)_{100-x},$$

wherein D denotes $SnO_2$ and $Ga_2O_3$, A denotes at least one oxide selected from $Ta_2O_5$ and $Y_2O_3$, and x is expressed on the basis of mol % and satisfies $30 \leq x \leq 95$.

14. An information recording medium for recording and/or reproducing information by applying light or electric energy, comprising:
a material layer containing a material which includes Sn, Y, and oxygen, wherein the material defined is by the following formula:

$$Sn_{h1}O_{i1}Y_{j1},$$

wherein h1, i1, and j1 are expressed on the basis of at % and satisfy the following; $5 \leq h1 \leq 40$, $40 \leq i1 \leq 70$, $0 < j1 \leq 35$, and $h1+i1+j1=100$.

15. The information recording medium according to claim 14, wherein the material layer contains oxides of Sn and Y.

16. The information recording medium according to claim 15, wherein the material layer contains a material defined by the following formula:

$$D_xA_{100-x},$$

wherein D denotes $SnO_2$, A denotes $Y_2O_3$, and x is expressed on the basis of mol % and satisfies $30 \leq x \leq 95$.

17. The information recording medium according to claim 14, wherein the material layer further contains Ta, and a combined concentration of Ta and Y is 35 at % or less in the material layer.

18. The information recording medium according to claim 16, wherein the material layer further contains $Ta_2O_5$, and a combined concentration of $Ta_2O_5$ and $Y_2O_3$ is not more than 70 mol % but not less than 5 mol % in the material layer.

19. The information recording medium according to claim 14, further comprising a phase-change type recording layer.

20. The information recording medium according to claim 19, wherein the material layer is in contact with at least one face of the recording layer.

21. The information recording medium according to claim 19, wherein the recording layer contains at least one material selected from Ge—Sb—Te, Ge—Sn—Sb—Te, Ge—Bi—Te, Ge—Sn—Bi—Te, Ge—Sb—Bi—Te, Ge—Sn—Sb—Bi—Te, Ag—In—Sb—Te, and Sb—Te.

22. The information recording medium according to claim 19, wherein the recording layer has a thickness of 15 nm or thinner.

23. A method for manufacturing an information recording medium that records and/or reproduces information by applying light or electric energy, the method comprising
forming a material layer containing Sn, Y, and oxygen by sputtering using a sputtering target containing Sn, Y, and oxygen,
wherein the sputtering target contains a material defined by the following formula:

$$Sn_{h2}O_{i2}Y_{j2},$$

wherein h2, i2, and j2 are expressed on the basis of at % and satisfy the following: $5 \leq h2 \leq 40$, $40 \leq i2 \leq 70$, $0 < j2 \leq 35$, and $h2+i2+j2=100$.

24. The method for manufacturing the information recording medium according to claim 23, wherein the sputtering target contains oxides of Sn and Y.

25. The method for manufacturing the information recording medium according to claim 24, wherein a concentration of oxides of Sn is 30 mol % or more in the sputtering target.

26. The method for manufacturing the information recording medium according to claim 23, wherein the sputtering target contains a material defined by the following formula:

$$(SnO_2)_x(Y_2O_3)_{100-x},$$

wherein x is expressed on the basis of mol % and satisfies $30 \leq x \leq 95$.

27. The method for manufacturing the information recording medium according to claim 23, wherein the sputtering target further contains Ta, and a combined concentration of Ta and Y is 35 at % or less in the sputtering target.

28. The method for manufacturing the information recording medium according to claim 26, wherein the sputtering target further contains $Ta_2O_5$, and a combined concentration of $Ta_2O_5$ and $Y_2O_3$ is not more than 70 mol % but not less than 5 mol % in the sputtering target.

29. An information recording medium for recording and/or reproducing information by applying light or electric energy, comprising:
a material layer containing a material which includes Ga, Ta, Y, and oxygen, wherein the material is defined by the following formula:

$$Ga_{h1}O_{i1}L_{j1},$$

wherein L denotes Ta and Y, h1, i1, and j1 are expressed on the basis of at % and satisfy the following; $5 \leq h1 \leq 40$, $40 \leq i1 \leq 70$, $0 < j1 \leq 35$, and $h1+i1+j1=100$.

30. The information recording medium according to claim 29, wherein the material layer contains oxides of Ga, Ta and Y.

31. The information recording medium according to claim 30, wherein the material layer contains a material defined by the following formula:

$$D_x A_{100-x},$$

wherein D denotes $Ga_2O_3$, A denotes $Ta_2O_5$ and $Y_2O_3$, and x is expressed on the basis of mol % and satisfies $30 \leq x \leq 95$.

32. The information recording medium according to claim 29, further comprising a phase-change type recording layer.

33. The information recording medium according to claim 32, wherein the material layer is in contact with at least one face of the recording layer.

34. The information recording medium according to claim 32, wherein the recording layer contains at least one material selected from Ge—Sb—Te, Ge—Sn—Sb—Te, Ge—Bi—Te, Ge—Sn—Bi—Te, Ge—Sb—Bi—Te, Ge—In—Bi—Te, Ag—In—Sb—Te, and Sb—Te.

35. The information recording medium according to claim 32, wherein the recording layer has a thickness of 15 nm or thinner.

36. A method for manufacturing an information recording medium that records and/or reproduces information by applying light or electric energy, the method comprising forming a material layer containing Ga, Ta, Y, and oxygen by a sputtering method using a sputtering target containing Ga, Ta, Y, and oxygen, wherein the sputtering target contains a material defined by the following formula:

$$Ga_{h2}O_{i2}L_{j2},$$

wherein L denotes Ta and Y, and h2, i2, and j2 are expressed on the basis of at % and satisfy the following: $5 \leq h2 \leq 40$, $40 \leq i2 \leq 70$, $0 < j2 \leq 35$, and $h2+i2+j2=100$.

37. The method for manufacturing the information recording medium according to claim 36, wherein the sputtering target contains oxides of Ga, Ta and Y.

38. The method for manufacturing the information recording medium according to claim 37, wherein a concentration of oxides of Ga is 30 mol % or more in the sputtering target.

39. The method for manufacturing the information recording medium according to claim 36, wherein the sputtering target contains a material defined by the following formula:

$$(D)_x(A)_{100-x},$$

wherein D denotes $Ga_2O_3$; A denotes $Ta_2O_5$ and $Y_2O_3$, and x is expressed on the basis of mol % and satisfies $30 \leq x \leq 95$.

* * * * *